(12) United States Patent
Nozawa

(10) Patent No.: US 8,912,678 B2
(45) Date of Patent: Dec. 16, 2014

(54) WAVE ACTIVATED POWER GENERATION SYSTEM WITH THE RACK AND PINION MECHANISM

(76) Inventor: Tsukasa Nozawa, Tokyo (JP)

( * ) Notice: Subject to any disclaimer, the term of this patent is extended or adjusted under 35 U.S.C. 154(b) by 15 days.

(21) Appl. No.: 13/566,730

(22) Filed: Aug. 3, 2012

(65) Prior Publication Data

US 2014/0035286 A1   Feb. 6, 2014

(51) Int. Cl.
*F03B 13/10* (2006.01)
*F03B 13/12* (2006.01)
*H02P 9/04* (2006.01)
*F03B 13/18* (2006.01)

(52) U.S. Cl.
USPC .................................. 290/53; 290/42; 60/507

(58) Field of Classification Search
USPC .......................................... 290/42, 53; 60/507
See application file for complete search history.

(56) References Cited

U.S. PATENT DOCUMENTS

| | | | | |
|---|---|---|---|---|
| 110,436 A * | 12/1870 | Close | ............................... | 60/504 |
| 385,327 A * | 6/1888 | Starkenberg | ..................... | 60/503 |
| 446,057 A * | 2/1891 | Copeland | ........................ | 60/504 |
| 639,733 A * | 12/1899 | Johnson | ........................... | 60/504 |
| 884,080 A * | 4/1908 | Fallis | ................................. | 60/507 |
| 987,685 A * | 3/1911 | Atkinson | ........................ | 60/507 |
| 998,756 A * | 7/1911 | Dean | ................................. | 74/422 |
| 1,004,332 A * | 9/1911 | Allen | ................................. | 60/507 |
| 1,098,208 A * | 5/1914 | Abbott | ............................ | 60/507 |
| 1,104,510 A * | 7/1914 | Ishii | .................................. | 60/507 |
| 1,213,104 A * | 1/1917 | Hulden | ........................... | 60/506 |
| 1,790,058 A * | 1/1931 | Morse | ............................... | 60/504 |
| 1,864,499 A * | 6/1932 | Grigsby | ........................... | 74/130 |
| 3,567,953 A * | 3/1971 | Lord | ................................. | 290/42 |
| 3,668,412 A * | 6/1972 | Vrana et al. | ..................... | 290/53 |
| 3,746,875 A * | 7/1973 | Donatelli | ........................ | 290/42 |
| 3,959,663 A * | 5/1976 | Rusby | .............................. | 290/53 |
| 4,034,565 A * | 7/1977 | McVeigh | ........................ | 60/503 |
| 4,108,578 A * | 8/1978 | Corey | .............................. | 417/331 |
| 4,184,336 A * | 1/1980 | Lamberti | ........................ | 60/507 |
| 4,228,360 A * | 10/1980 | Navarro | ........................... | 290/43 |
| 4,249,085 A * | 2/1981 | Kertzman | ........................ | 290/53 |
| 4,305,003 A * | 12/1981 | Basurto et al. | ..................... | 290/54 |
| 4,355,511 A * | 10/1982 | Jones | ............................... | 60/507 |
| 4,392,060 A * | 7/1983 | Ivy | .................................... | 290/53 |
| 4,418,286 A * | 11/1983 | Scott | ................................ | 290/42 |
| 4,434,375 A * | 2/1984 | Taylor | ............................. | 290/53 |
| 4,539,484 A * | 9/1985 | Suggs | .............................. | 290/53 |
| 4,599,858 A * | 7/1986 | La Stella et al. | ................ | 60/497 |
| 4,627,240 A * | 12/1986 | Holmes | ........................... | 60/507 |
| 5,929,531 A * | 7/1999 | Lagno | ............................. | 290/53 |

(Continued)

FOREIGN PATENT DOCUMENTS

WO   WO 2007/125307 A2   11/2007

OTHER PUBLICATIONS

International Search Report and Written Opinion of the counterpart Application No. PCT/IB2013/001693, mailed Mar. 4, 2014.

*Primary Examiner* — Pedro J Cuevas
(74) *Attorney, Agent, or Firm* — Juan Carlos A. Marquez; Bacon & Thomas PLLC

(57) ABSTRACT

The present invention is directed to a wave activated power generation system that converts the vertical movement of one or more power generation buoys resulting from interaction with waves into energy producing gyrations via a rack and pinion mechanism. The square-shaped power generation buoys are manufactured from fiber-reinforced plastic material.

16 Claims, 20 Drawing Sheets

(56) References Cited

U.S. PATENT DOCUMENTS

| | | | |
|---|---|---|---|
| 7,045,912 B2* | 5/2006 | Leijon et al. | 290/42 |
| 7,305,823 B2* | 12/2007 | Stewart et al. | 60/495 |
| 7,348,764 B2* | 3/2008 | Stewart et al. | 322/24 |
| 7,352,073 B2* | 4/2008 | Ames | 290/42 |
| 7,444,810 B2* | 11/2008 | Olson | 60/495 |
| 7,525,214 B2* | 4/2009 | Atilano Medina et al. | 290/53 |
| 7,687,931 B2* | 3/2010 | Gasendo | 290/54 |
| 7,785,163 B2* | 8/2010 | Spencer et al. | 441/1 |
| 7,791,213 B2* | 9/2010 | Patterson | 290/53 |
| 7,841,177 B1* | 11/2010 | Detwiler | 60/497 |
| 7,969,033 B2* | 6/2011 | Ryan | 290/53 |
| 8,013,462 B2* | 9/2011 | Protter et al. | 290/53 |
| 8,476,782 B2* | 7/2013 | Chi et al. | 290/53 |
| 8,487,459 B2* | 7/2013 | Eder et al. | 290/42 |
| 8,587,139 B2* | 11/2013 | Gerber | 290/42 |
| 8,723,355 B2* | 5/2014 | Eder et al. | 307/9.1 |
| 8,745,981 B1* | 6/2014 | Hanna | 60/398 |
| 2004/0145079 A1 | 7/2004 | Lin et al. | 264/257 |
| 2007/0130929 A1* | 6/2007 | Khan et al. | 60/398 |
| 2008/0016863 A1* | 1/2008 | Tai et al. | 60/497 |
| 2009/0072540 A1* | 3/2009 | McCague et al. | 290/53 |
| 2009/0146429 A1* | 6/2009 | Protter et al. | 290/53 |
| 2010/0041289 A1* | 2/2010 | Spencer et al. | 441/1 |
| 2010/0045044 A1* | 2/2010 | Patterson | 290/53 |
| 2010/0148504 A1* | 6/2010 | Gerber | 290/42 |
| 2010/0264659 A1* | 10/2010 | Chi et al. | 290/53 |
| 2011/0012368 A1* | 1/2011 | Hahmann et al. | 290/1 C |
| 2011/0084488 A1* | 4/2011 | Eder et al. | 290/53 |
| 2011/0173968 A1* | 7/2011 | Ahdoot | 60/507 |
| 2011/0254270 A1* | 10/2011 | Ayntrazi | 290/42 |
| 2012/0074702 A1* | 3/2012 | Ahdoot | 290/53 |
| 2012/0200156 A1* | 8/2012 | Weller | 307/21 |
| 2012/0248865 A1* | 10/2012 | Eder et al. | 307/9.1 |
| 2012/0261923 A1* | 10/2012 | Hassavari | 290/53 |
| 2013/0069370 A1* | 3/2013 | Ames | 290/53 |
| 2013/0113211 A1* | 5/2013 | Rohrer | 290/42 |
| 2013/0127168 A1* | 5/2013 | Dragic | 290/53 |
| 2013/0161948 A1* | 6/2013 | Sarokhan | 290/42 |
| 2013/0313829 A1* | 11/2013 | Weller | 290/53 |
| 2014/0132003 A1* | 5/2014 | Hayashi et al. | 290/53 |
| 2014/0145442 A1* | 5/2014 | Hart | 290/53 |

* cited by examiner

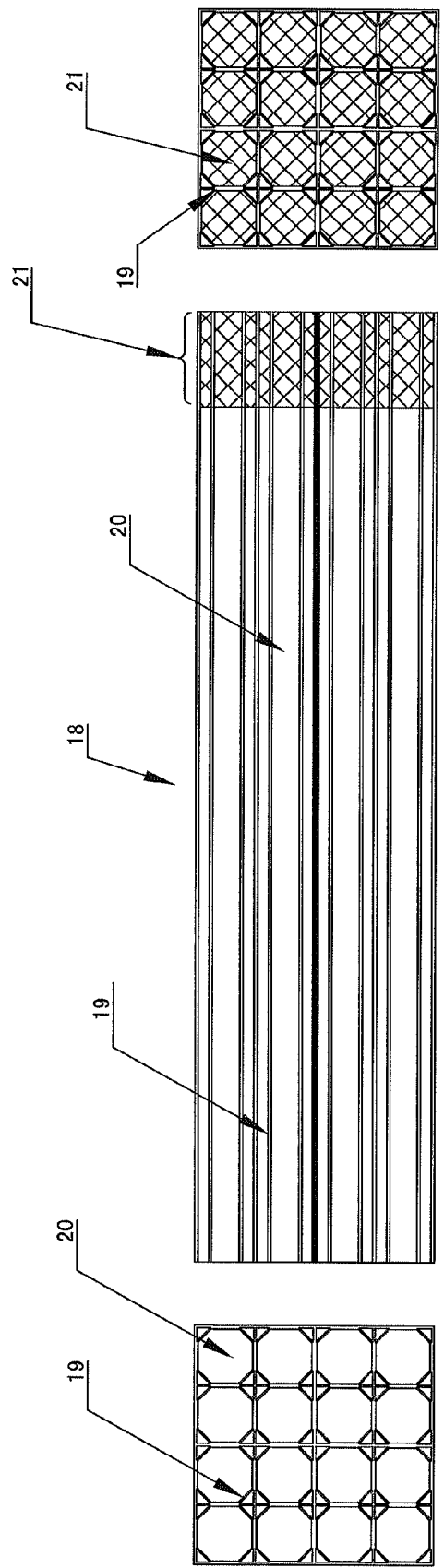

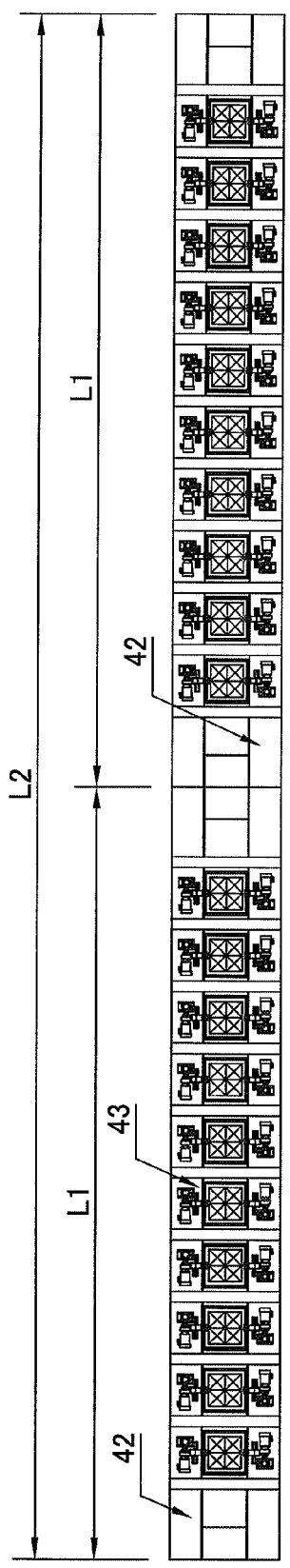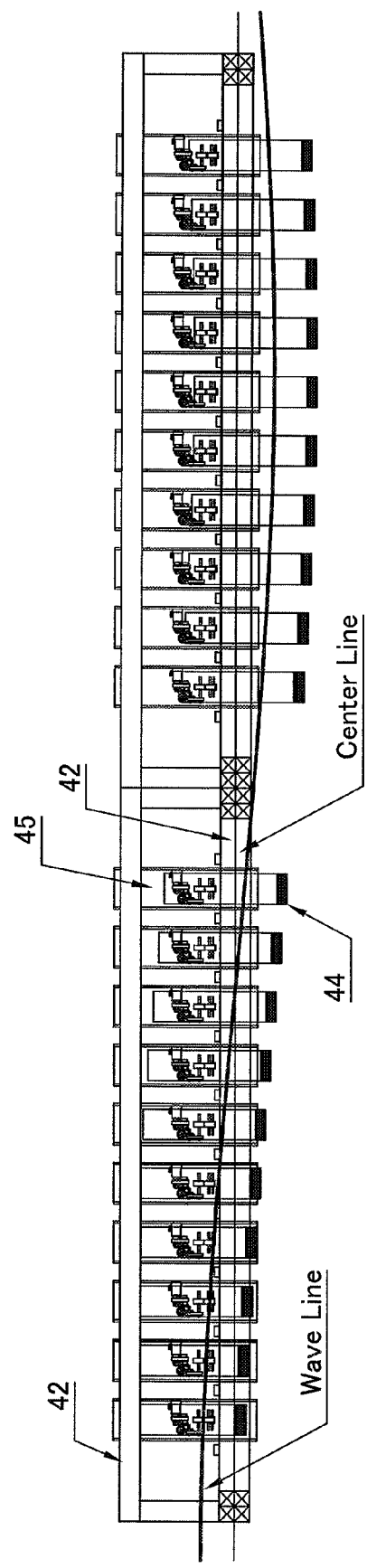
Figure 16A
Figure 16B

WAVE ACTIVATED POWER GENERATION SYSTEM WITH THE RACK AND PINION MECHANISM

BACKGROUND OF THE INVENTION

1. Field of the Invention

This invention is concerned with a wave activated power generation system using a rack and pinion mechanism, in which a plurality of rectangular power generation buoys manufactured from fiber-reinforced plastic material are activated by wave action.

2. Description of the Prior Art

It is a root demand to enjoy a safe, comfortable civilization life. Modern civilization is based on electrical energy. The demand for electrical energy never disappears as long as the human race exists.

With ocean energy, wave activated power generation is the steadiest form of power generation energy. It is characterized by the large amount available. The energy per unit area is 20-30 times of photovoltaic generation energy and is at least five times more than the force of winds. The ability of the wave activated power generation is given by natural environment in the installation location and the weather conditions. It is not uniform in all the oceans. The usage of wave activated power generation is put to practical use as a power supply of beacon buoys now. However, there is still a problem with stability and potential damage during stormy weather.

The advantages in which the wave activated power generation is adopted are as follows.
  (A) Wave activated power generation is eternal energy.
  (B) Wave energy is clean, safe, cheap and abundant. Oil fuel and the nuclear power are unnecessary with wave activated power generation of natural energy.
  (C) The needed area for the wave activated power generation is smaller than that of wind power generation or photovoltaic generation.
  (D) It is said that the wave activated power generation can generate 30,000 kW in an area of 1K square meters.
  (E) As the matter of the wave activated power generation, the influence on the appearance of the surrounding area is a little compared with wind power generation.
  (F) The amount of power generation can be easily estimated because the conditions of the waves maybe forecast from the local wind conditions.
  (G) The structural mechanism is simple and the complex gearbox is unnecessary.

The system of wave activated power generation has some methods. When classified roughly, it is as follows.
  (a) Method to use top and bottom of wave vibration
  (b) Method to use horizontal vibration of wave
  (c) Method to use the seawater stored to the water pond by using the wave force and to rotate the water mill.
  (d) Additionally, there is a method of using both of (a) and (b) together, too.

The method of (a) is being researched by a lot of research laboratories. That is the one to operate the turbine by ventilating the compressed air generated by a top and bottom of the wave vibration. This method is called the turbine method and a vibration water column type. The structure is simple and is excellent in durability. It is a main current now. There is also a simple method, such as moving the coil up and down in the magnetic field floating body vibration. Moreover, there is the one of the pendulum type that uses the horizontal vibration of the wave of (b), too.

3. Problems the Invention is Solving

This invention is directed to the application of a wave activated power generation system by rack and pinion mechanism in which pluralities of square pillars manufactured from FRP material are activated by sea wave.

With ocean energy, wave activated power generation is the steadiest form of power generation energy. It is characterized by the large amount available. The energy per unit area is 20-30 times of photovoltaic generation energy and is at least five times more than the force of winds. However, wave activated power generation is not so widespread. The usage is limited to small-scale power supply equipment, and it has a problem of being damaged by stormy weather.

As for the method called the turbine and vibration water column method, the structure used therein is simple and has excellent durability. But it is necessary to turn the turbine blades by compression air. A large amount of energy is needed to turn the turbine blades with air. The energy of the sea wave becomes large if it totals it. However, individual energy is small. It is thought that a mechanical method is preferable to take out a lot of small energy.

The corrosion problem with seawater is not solved. Steel and aluminum have enough structural strength for wave activated power generation, but they are easily corroded by seawater. The power generation buoy that is bored by corrosion loses buoyancy. Wood also rots by seawater. FRP material is excellent in structural strength and durability. However, its manufacturing cost is expensive because the manufacturing process has not been established.

SUMMARY OF THE INVENTION

To answer the problems and the current state demanded by the use of a wave activated power generation system, the processing technology and concept for them are described herein.

In terms of the wave activated power generation system, the most important problem that should be solved is the manufacturing of a power generation buoy that can endure exposure to seawater. The demand on the power generation buoy is not only the endurance against corrosion. It is necessary that the power generation buoy floats on the sea and stands up vertically in the sea. Moreover, it is preferable that the power generation buoy is filled with the material that prohibits the infiltration of seawater.

Also, a second demand is that the mechanism of converting the vertical movement into the gyration works with good efficiency. It is preferable that the mechanism has the ability to stop power generation system during stormy weather.

To satisfy the first demand, glass fiber FRP material is chosen. Glass fiber FRP is a compound material of the glass fiber and epoxy resin, and neither the glass fiber nor epoxy resin can be corroded by seawater. Moreover, it is easy to get the raw materials as price of such material is low. The process of manufacturing FRP structural material for the wave activated power generation is the same process as the application Ser. No. 13/407,196 "A HONEYCOMB STRUCTURE HAVING HONEYCOMB CORE ARRANGED PARALLEL TO A PANEL SURFACE AND A MANUFACTURING PROCESS THEREFOR". The FRP structures for power generation buoy are manufactured from four-corner type though the FRP structure shown in application Ser. No. 13/407,196 is a honeycomb structure of six-corner type. This method can mass-produce FRP structural material at low cost.

The honeycomb structure of six-corner type is less limited in the size than four-corner type structure, and is more excellent in structural strength. However, the power generation buoy only moves up and down in the shroud assembly by ocean wave. The power generation buoy does not need special strength. It is enough in the FRP structure of four-corner type.

In application Ser. No. 13/407,196, vapor pressure power is used to pressurize the internal pressure device made of heat proof plastic. In this invention, styrene foam is used instead of the vapor pressure power of water and alcohol. The bead of the styrene foam foams because of steam when heating it filling the bead of the styrene foam in the internal pressure device. The internal pressure device is pressurized by the foaming pressure of the styrene foam. The styrene foam remains in the FRP structure. The styrene foam filled in the internal pressure device prevents seawater from invading into the power generation buoy.

The power generation buoy is filled with the styrene foam, so it floats on the sea. And when the weight of iron is attached at the bottom part of buoy, the power generation buoy stands vertically in seawater. However, because the weight of iron is corroded with seawater, it is inferior to durability. When iron rubbish is filled at the bottom part of the power generation buoy and the iron rubbish is hardened with the urethane resin, the power generation buoy stands vertically in the sea. The iron rubbish does not come in contact directly with seawater because it is hardened with the urethane resin.

To satisfy the second demand, the mechanical method of converting the vertical movement into the gyration is chosen. Current method by compression air is inefficient. The reason is that the energy of the wave is converted into thermal energy by the process into which air is compressed. The thermal energy generated by compressed air is the loss in vain. In this invention, the energy of the wave is taken out as vertical movement generated by a buoyancy of the seawater and the gravity of the earth.

In general, crank and piston mechanism is used to convert the vertical movement into the gyration. It is adopted for the piston engine etc. However, the crank and piston mechanism is not applicable to the power generation buoy. The reason is that the amplitude of the wave is not constant. The crank mechanism does not rotate when the amplitude of the vertical movement is not constant.

In this invention, the mechanism of rack and pinion is adopted. Rack and pinion mechanism can convert the vertical movement of the variable amplitude wave into the gyration. Of course, there is some limitation. The amplitude of the wave at stormy weather has the danger to exceed the length of the rack gear. At stormy weather it is necessary to stop the vertical movement generated by the wave.

The power generation buoy repeats the vertical movement because of buoyancy and gravity. The pinion gear converts the vertical movement of the rack gear, which is attached to power generation buoy into the gyration. The wave activated power generation turns a dynamo with the rotating torque of the pinion gear, and obtains the electric power. The rotating torque load of the dynamo is equal to the frictional force for the power generation buoy. The power generation buoy does not fall down by gravitation when the frictional force is larger than the gravity load. The power generation buoy stops the vertical movement in the air. When the pinion gears are connected to the dynamo with the gearless transmission, the torque of the dynamo can be arbitrarily varied. It becomes possible to stop the power generation buoy at stormy weather.

The speed of the pinion gear is changed by the wave conditions. When rotating movement of the pinion gear generates electricity, the electricity is an exchange current. The rotation speed of dynamo is not constant. The frequency of current is varied by the rotating speed of dynamo. It is preferable that the current of the wave activated power generation is converted into the direct current.

BRIEF DESCRIPTION OF THE DRAWINGS

FIGS. 6A-6C show a power generation buoy of wave activated power generation using the references (18) power generation buoy, (19) glass fiber FRP, (20) styrene foam, (21) weight mass.

FIGS. 16A and 16B show the image chart of the long size wave activated power generation module with the references (42) rigid barge, (43) power generation unit, (44) power generation buoy and (45) shroud assembly (L1) Length of single module and (L2) Length of double module.

DESCRIPTION OF THE PREFERRED EMBODIMENT

Figure 1:
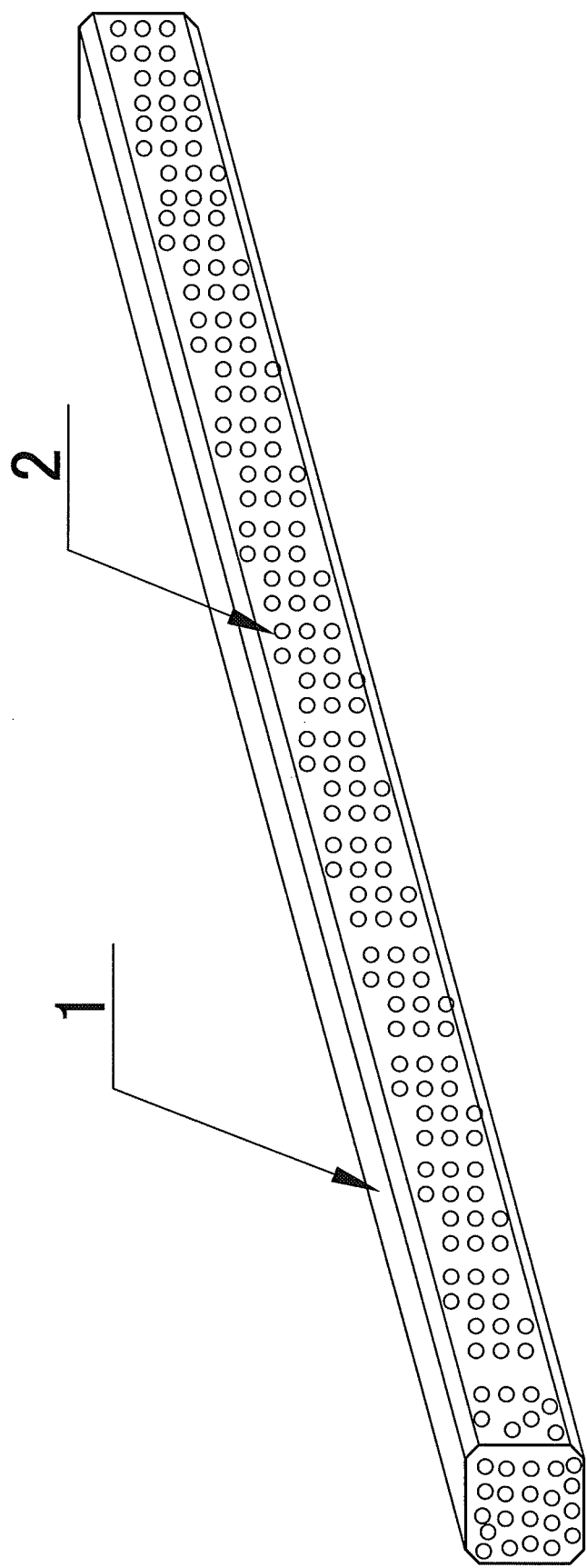
FIG. 1 shows a square pillar internal pressure device using the references of (1) square pillar internal pressure device, and (2) beads of styrene foam.

Referring to the drawing as follows, it explains the form of concrete execution of the manufacturing process of power generation buoy and explains wave activated power generation system by rack and pinion mechanism.

FIG. 1 shows a square pillar internal pressure device. The square pillar internal pressure device (1) is made from heat-proof plastic tube and it has enough length and it encloses beads of styrene foam (2). As for the both ends of square pillar internal pressure device (1), they are sealed lightly to prevent the beads of styrene foam (2) dropping off from (1). The seal is not shown in the figure.

The square pillar internal pressure device (1) can be made from the tube of heatproof plastic material, so the length of the internal pressure device (1) is arbitrary. The beads of the styrene foam (2) are foamed by heat and the pressure of steam.

The reason why every corner of the square pillar internal pressure device is chamfered is following reasons:

A. It is difficult to manufacture the corner part of plastic squarely when the product is manufactured from the metal mold of pushing out or blowing process.

B. It is impossible to press every corner of the square pillar internal pressure device when internal pressure expands the internal pressure device.
  (a) The internal pressure expands the internal pressure device roundly like the cylinder.
  (b) Therefore, the internal pressure device cannot pressurize the corner edge.

C. Every four corners of the FRP pillar material are pressurized with a thermal expansion solid resin.
  (a) The powder, which generates the bubble by heating, is kneaded to the heat foam resin.
  (b) When the heat foam powder is heated, the powder generates a large amount of small bubbles.
  (c) A large amount of small bubbles swells within the resin, and expands the heat foam resin.
  (d) As for the heat foam resin, a polyethylene system resin or a polypropylene system resin is selected.
  (e) Those resins have the strength by which a large amount of small bubbles can be maintained at the high temperature.

Figure 2:
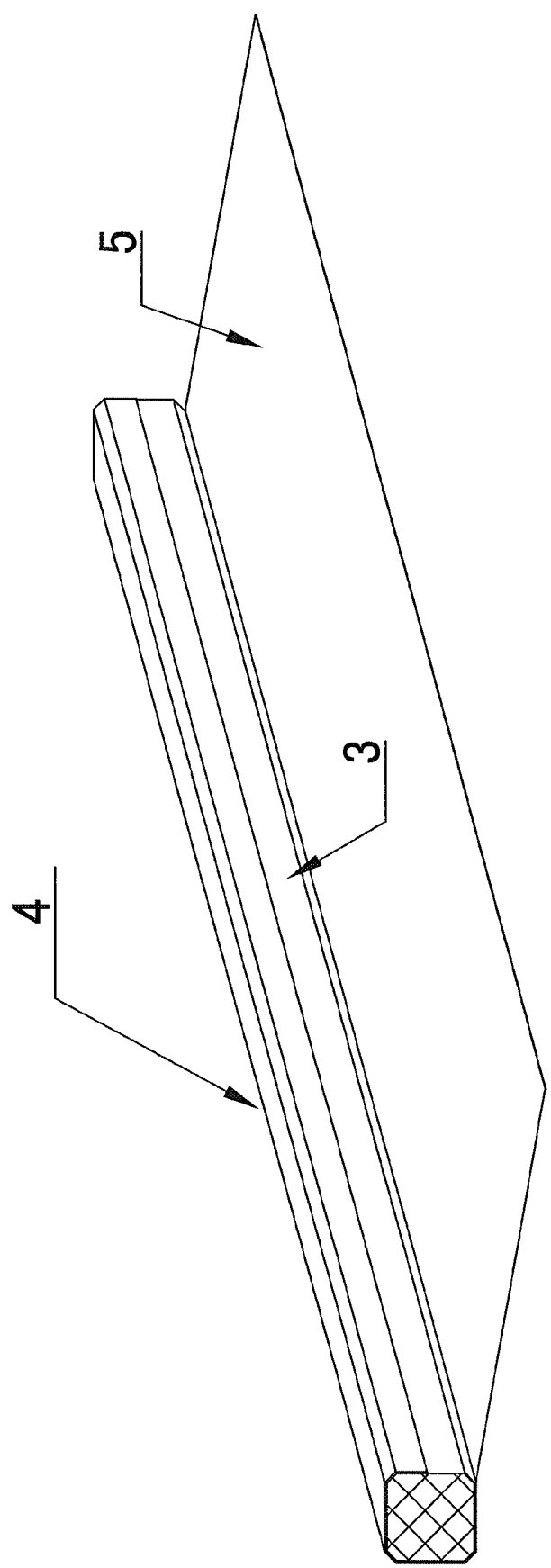
FIG. 2 shows a square pillar internal pressure device assembly that uses the references (3) square pillar internal pressure device, (4) square pillar internal pressure device assembly, and (5) soft FRP prepreg.

FIG. 2 shows a square pillar internal pressure device assembly. The square pillar internal pressure device assembly (4) is manufactured by wrapping the external surface of square pillar internal pressure device (3) with a soft FRP prepreg (5) two or more times. The soft FRP prepreg (5) becomes the internal FRP wall of FRP structure materials.

At room temperature, the soft FRP prepreg (5) is a wet soft cloth, so it is not difficult to wrap the square pillar internal pressure device (3) with the soft FRP prepreg (5). The adhesive of prepreg deteriorates at the room temperature; it is preferable to preserve the product within the freezer at minus 5° C. or less.

Figure 3:
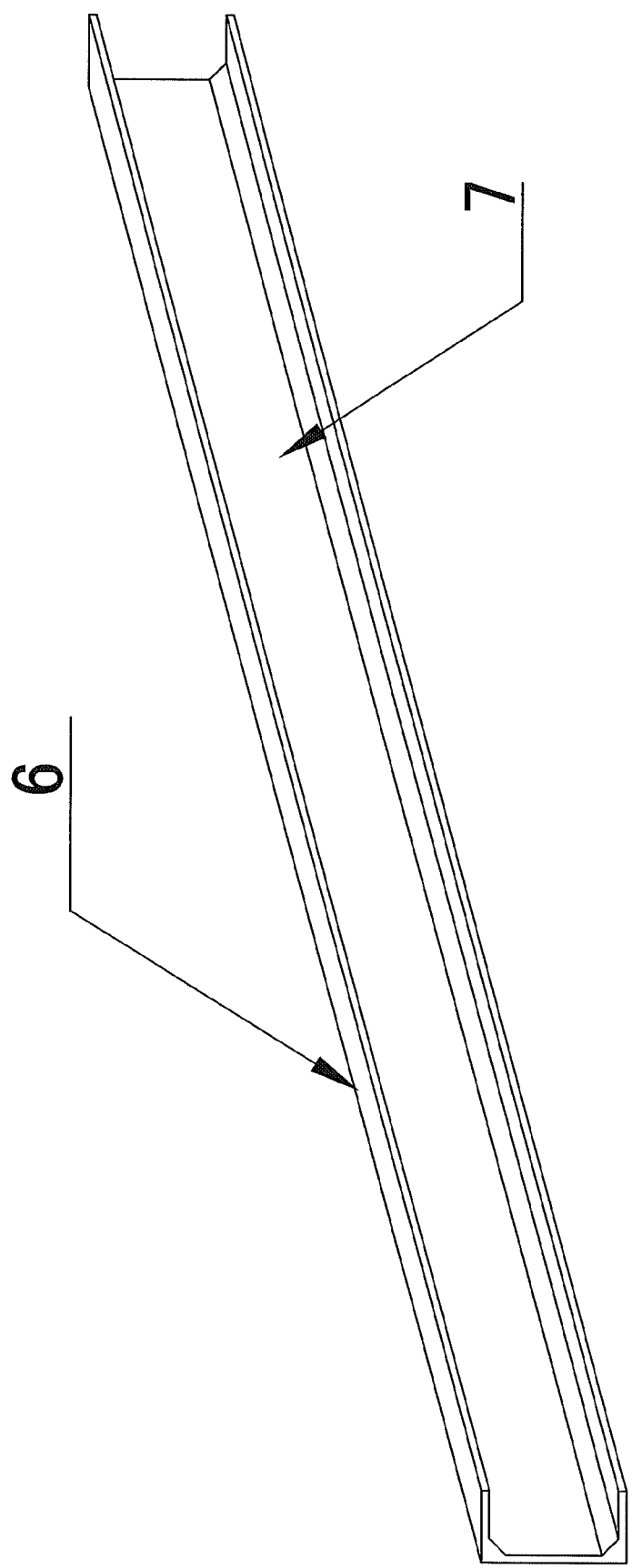
FIG. 3 shows a solid-type pressure device using the references (6) square solid-type pressure device of half cut, and (7) square vacant space of half cut.

FIG. 3 shows a solid-type pressure device. The solid-type pressure device of half cut (6) is made from the heat foam plastic resin by the metal mold of pushing out. It has the same length as the square pillar internal pressure device assembly and has square vacant space of half cut (7) inside it. As the solid-type pressure device can be manufactured by metal mold of pushing out, the length of the solid-type pressure device is arbitrary.

The reasons why a square solid pressure device is necessary are as follows.

A. Because the pillars of FRP structure materials are manufactured by assembling the four square pillars, the size accuracy requested to a basic square pillar is severe.

B. It is difficult to pressurize a square corner part by the internal pressure device.
  (a) The internal pressure device expands to the form of a cylinder.

C. The solid pressure device can pressurize the corner part of a square pillar.
  (a) Because the solid pressure device is manufactured from the heat foam resin, the accuracy of the shape size is good.
  (b) The solid pressure device can make a lot of heat foam resins gather in a square corner part.
  (c) Big expansion pressure can be generated in a square corner part by a large amount of heat foam.

Figure 4:
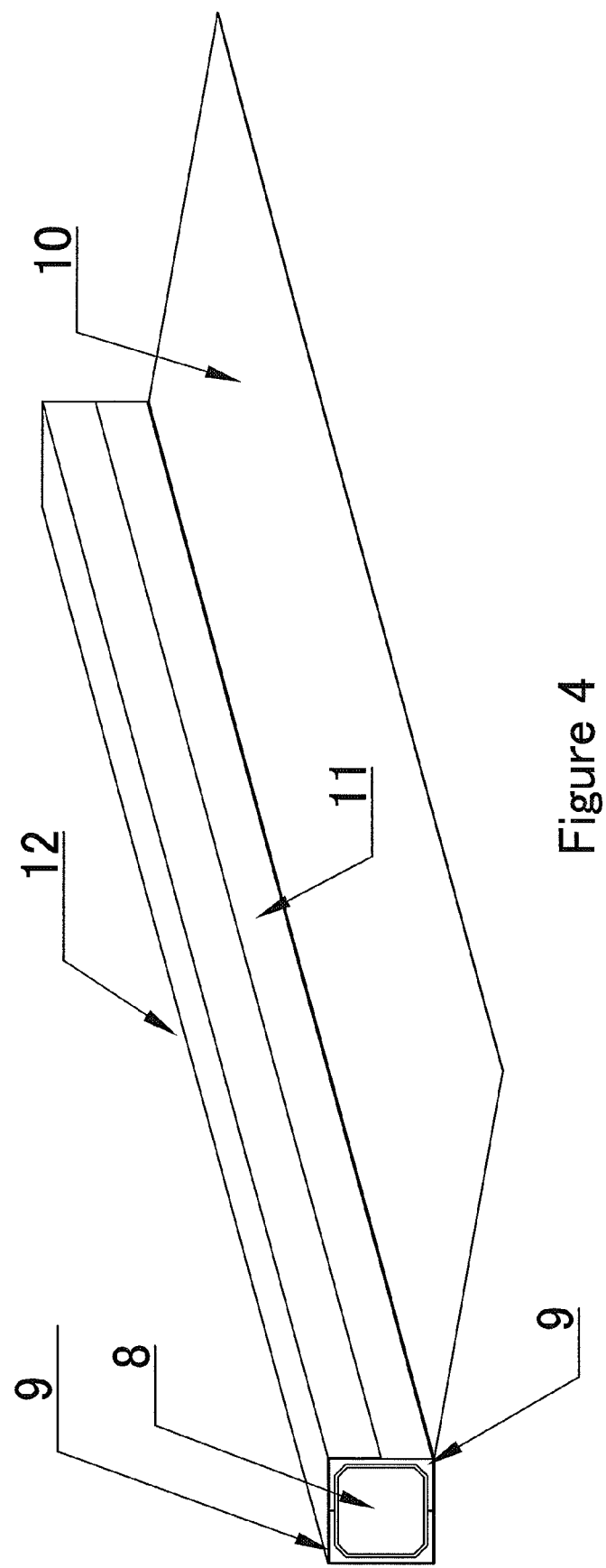
FIG. 4 shows a basic square pillar assembly using the references (8) square pillar internal pressure device assembly, (9) square solid-type pressure device of half cut, (10) soft FRP prepreg, (11) square solid-type pressure device, and (12) basic square pillar assembly.
Figures 5A, 5B, 5C, 5D:
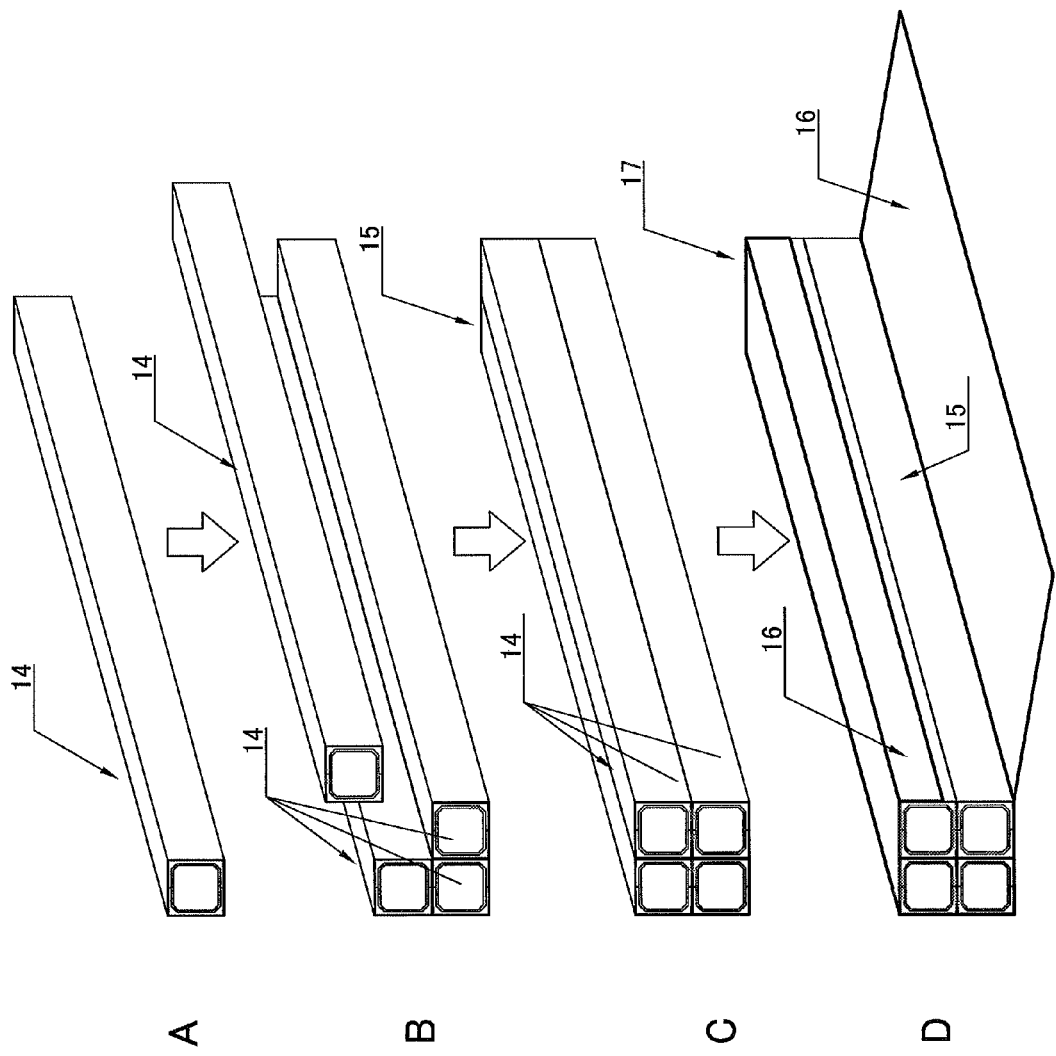
FIGS. 5A-5D show an assembly procedure explanation chart for FRP structure pillar material with the references (14) basic square pillar assembly, (15) square pillar unit, (16) soft FRP prepreg, and (17) FRP structure pillar material with four basic pillar assemblies.

FIG. 4 is a basic square pillar assembly. When two parts of square solid-type pressure device of half cut (9) are combined, they are shaped to be square solid-type pressure device (11) with square vacant space inside it. The square pillar internal pressure device assembly (8) is stored in the square vacant space of the square solid-type pressure device (11). The basic square pillar assembly (12) is manufactured by wrapping the square solid-type pressure device (11) two or more times by the soft FRP prepreg (10). This basic square pillar assembly (12) is used as the base element of FRP structure materials.

At room temperature, the soft FRP prepreg (10) is the wet soft cloth, so it is not difficult to wrap square solid-type pressure device (11) with the soft FRP prepreg (10). Because the adhesive of prepreg deteriorates at the room temperature, it is preferable to preserve the product within the freezer at minus 5° C. or less.

FIGS. 5A-5D show an assembly procedure explanation chart of FRP structure pillar material that illustrates the procedure sequence as follows:
  A. The process of preparation is as follows:
    (a) Four basic square pillar assemblies (14) preserved in the freezer at minus 5° C. or less are taken out from the freezer.
    (b) The adhesive function of FRP prepreg is lost at that temperature therefore it is not difficult to assemble them.
  B. The first step is as follows:
    (a) Four basic square pillar assemblies (14) are combined with horizontal direction and the vertical direction.
    (b) One square pillar unit (15) with four basic square pillar assemblies is manufactured.
  C. The second step is as follows:
    (a) FRP pillar structure material with four basic square pillar assemblies (17) is manufactured by wrapping the square pillar unit (15) with the soft prepreg (16).

Theoretically, the square pillar can be infinitely arranged. However the structural position is not unique. It is difficult to connect more than four pillars to one unit. Honeycomb structure is superior for a large-scale structure. But, the square pillar can be manufactured in low-cost when it is compared with the honeycomb structures. The square pillar is suitable for the power generation buoy of wave activated power generation.

The pressurizing process and the heat stiffening process by the internal pressurizing device and the external frame reaction force are the same as the manufacturing process of the application Ser. No. 13/407,196 "A HONEYCOMB STRUCTURE HAVING HONEYCOMB CORE ARRANGED PARALLEL TO A PANEL SURFACE AND A MANUFACTURING PROCESS THEREFOR".

Internal pressure device by the styrene foam is useful for expanding method instead of the vapor pressure. Water and alcohol need not be drained from the internal pressure device after the heat stiffening process; the process is shown in application Ser. No. 13/407,196. Epoxy resin stiffens completely during the cooling time though epoxy resin, which is the bonding resin of the FRP prepreg, starts stiffening at 130° C. Therefore, the internal pressure device should keep pressurizing the FRP prepreg during the cooling time. The styrene foam is manufactured from cooling gradually with pressurizing it. The manufacturing process is the same.

FIGS. 6A-6C illustrate a power generation buoy for wave activated power generation. FIG. 6B is a front chart. FIG. 6A is a left side chart, and FIG. 6C is a right side chart. The power generation buoy (18) is composed of 16 basic elements. Each basic element is manufactured from glass fiber FRP (19), and the styrene foam (20) is filled. The weight mass (21) is installed at the bottom part of the power generation buoy. The weight mass is the one that the iron rubbish was hardened with the urethane resin.

The power generation buoy is filled with the styrene foam. Seawater cannot invade into the power generation buoy, so it floats on the sea. And when the weight of iron is installed at the bottom part of buoy, the power generation buoy stands vertically in seawater. The weight mass is the one that the iron rubbish was hardened with the urethane resin. The iron rubbish does not come in contact directly with seawater because it is hardened with the urethane. And, glass fiber FRP is a compound material of the glass fiber and epoxy resin, and neither the glass fiber=nor epoxy resin is corroded by seawater. Therefore, the power generation buoy is not corroded with seawater. The durability of power generation buoy is excellent.

The specs of the power generation buoy of FIG. 6A-6C are shown in Table 1. The length of the power generation buoy is 6,000 mm. The buoyancy of the buoy is calculated to be 13,500 kgf from the volume. Weight material of the buoy is calculated to be 3,222 kgf. The weight force of the iron rubbish is 1,463 kgf. The total weight force is 4,685 kgf, so the power generation buoy sinks by about 2,082 mm, and stands up vertically in the water:

TABLE 1

| Length (mm) | Width (mm) | Height (mm) | Buoyancy (kgf) | Weight (kg) Buoy | Weight mass | Total |
|---|---|---|---|---|---|---|
| 6000 | 1500 | 1500 | 13500 | 3222 | 1463 | 4685 |

Figures 7A, 7B:
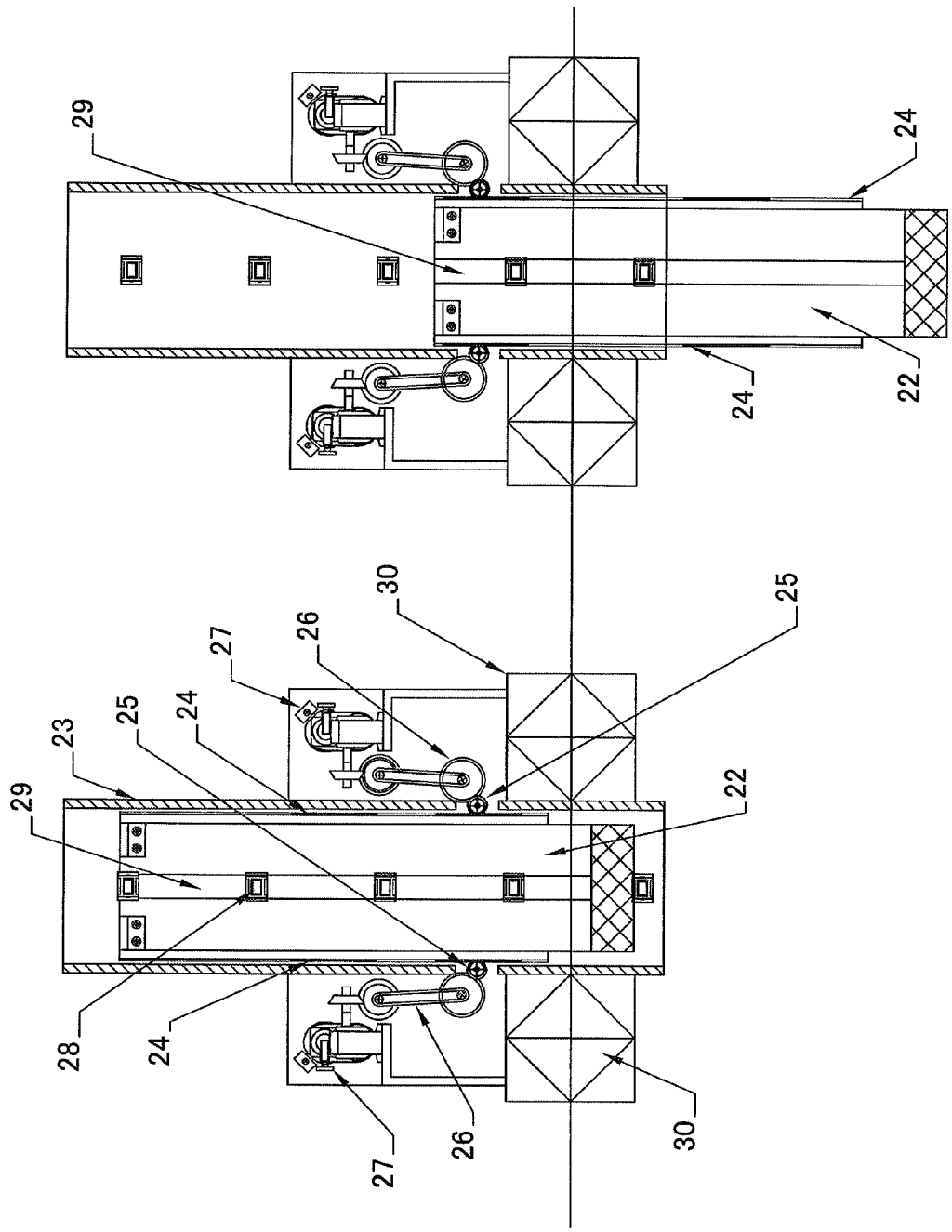
FIGS. 7A and 7B show an wave activated power generation unit with the references (22) power generation buoy, (23) shroud assembly, (24) rack gear, (25) pinion gear, (26) gearless transmission, (27) dynamo, (28) support roller, (29) shuttle slide and (30) rigid barge.
Figures 8A, 8B, 8C, 8D, 8E:
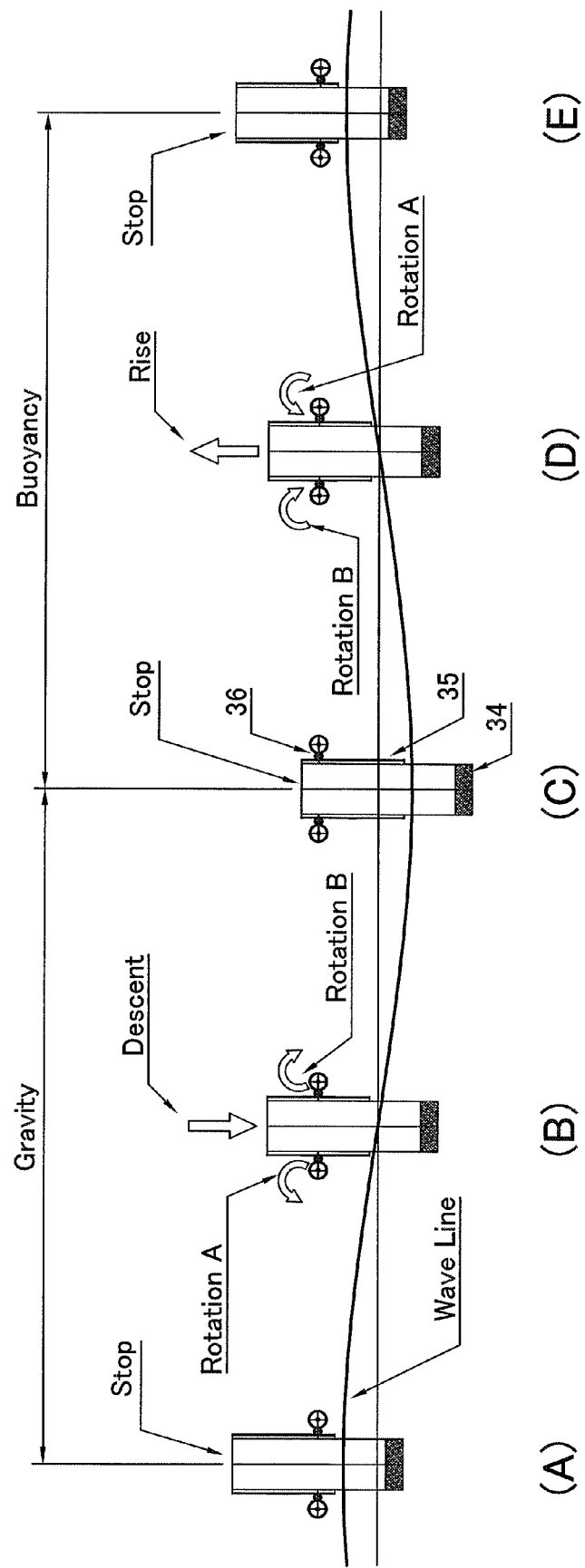
FIGS. 8A-8E show the image chart, which convert the vertical movement of the power generation buoy into the gyration by rack and pinion mechanism, with the references (34) power generation buoy, (35) rack gear and (36) pinion gear.
Figures 9A, 9B, 9C, 9D, 9E:
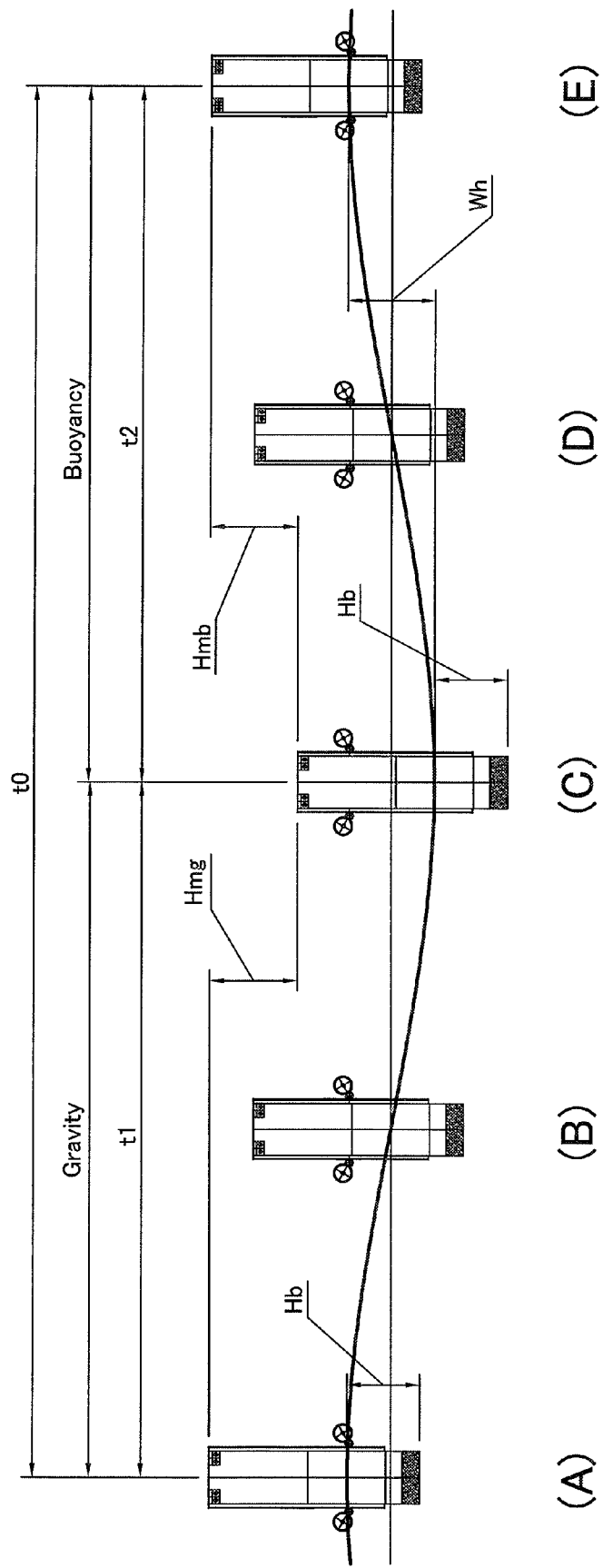
FIGS. 9A-9E show the free vibration chart of power generation buoy in 2500 mm height of ocean wave with the references (t0) cycle of wave, (t1) period of descent, (t2) period of rise, (Hmg) moving height by gravity, (Hmb) moving height by buoyancy, (Hb) depth of sinking by buoy weight and (Wh) wave height.
Figures 10A, 10B, 10C, 10D, 10E:
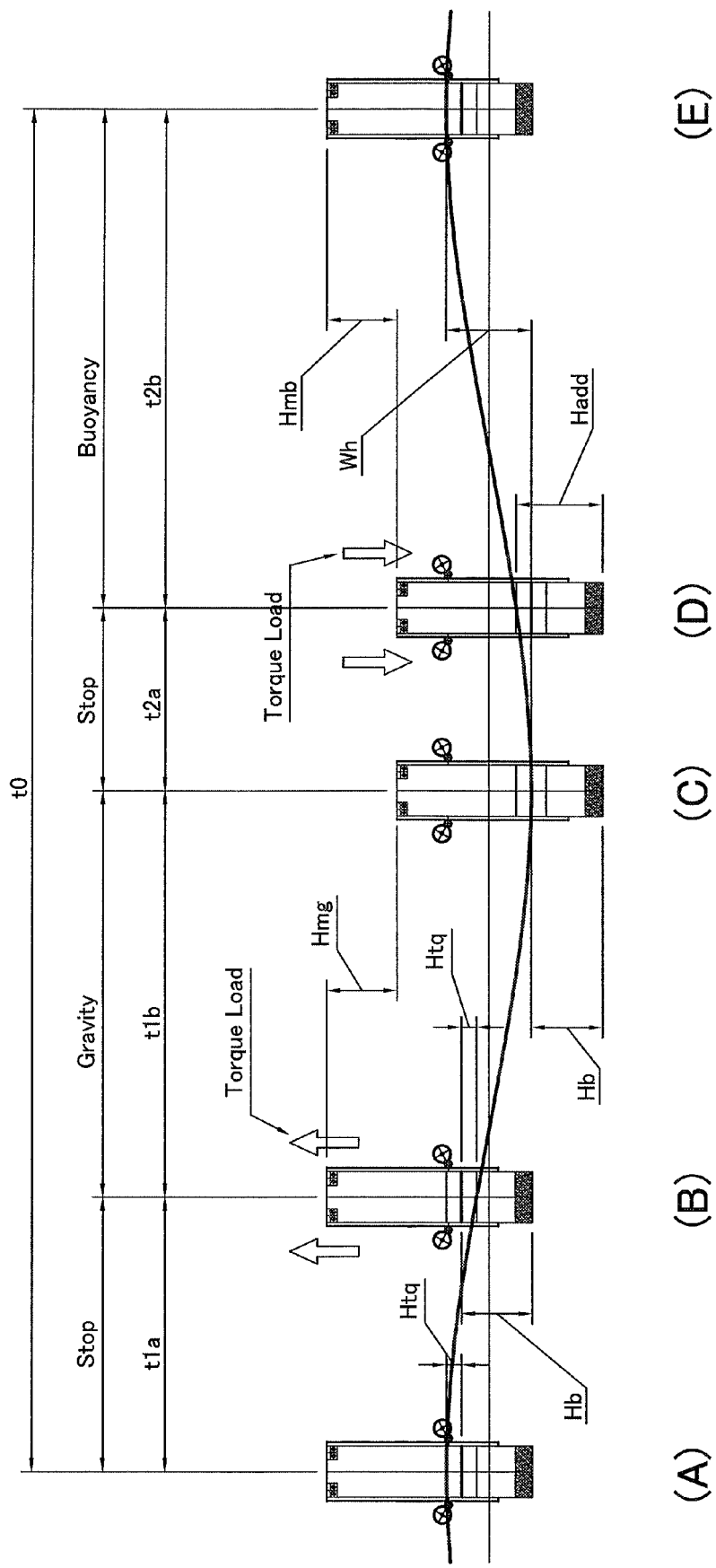
FIGS. 10A-10E show the image chart of the power generation buoy movement with torque load (1000 kgf) in 2500 mm height of ocean wave with the references (t0) cycle of wave, (t1a) period of stop in descent, (t1b) period of descent, (t2a) period of stop in rise, (t2b) period of rise, (Hmg) moving height by gravity, (Hmb) moving height by buoyancy, (Hb) depth of sinking by buoy weight, (Htq) depth of sinking by torque load, (Hadd) depth of sinking by buoy weight and torque load and (Wh) wave height.
Figures 11A, 11B, 11C, 11D, 11E, 11F:
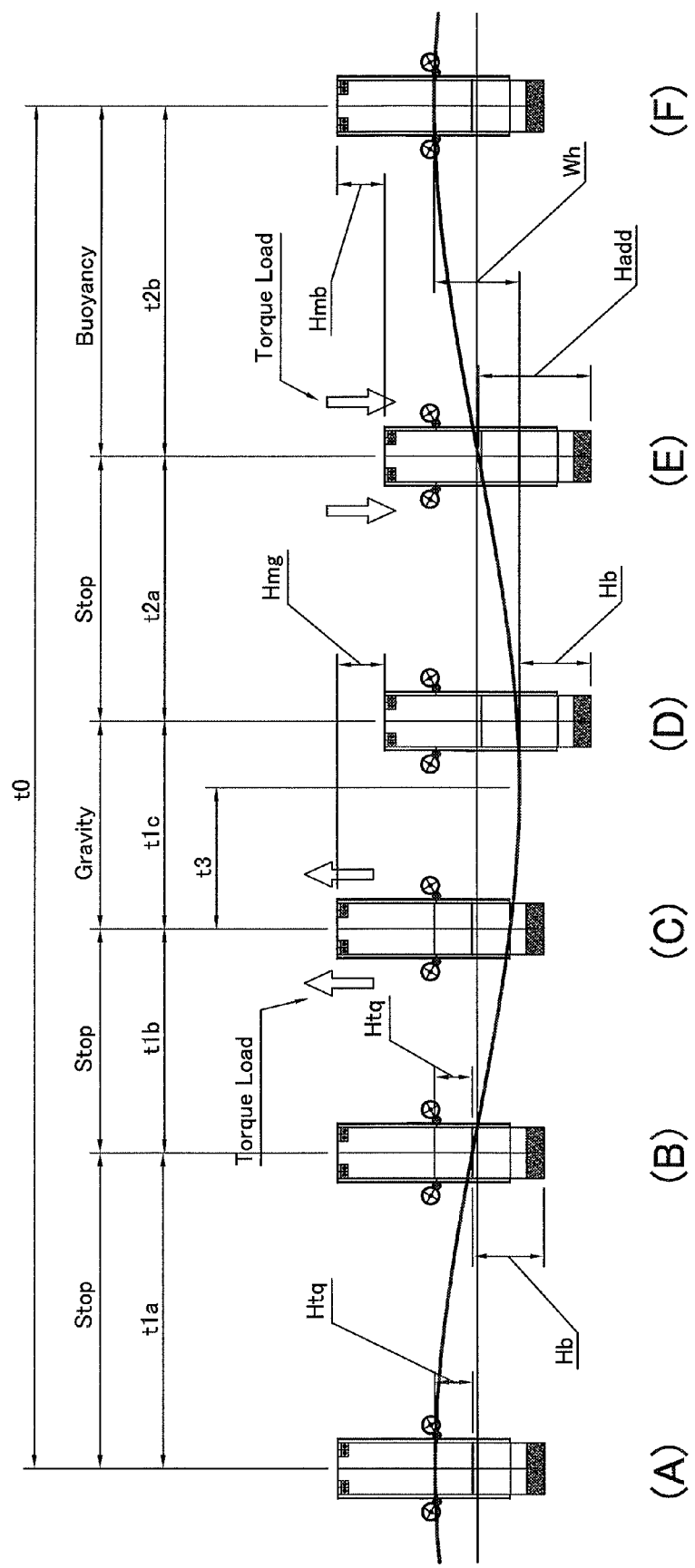
FIGS. 11A-11F show the image chart of the power generation buoy movement with torque load (2500 kgf) in 2500 mm height of ocean wave with the references (t0) cycle of wave, (t1a) period of stop to balance point, (t1b) period of stop in descent, (t1c) period of descent, (t2a) period of stop in rise, (t2b) period of rise, (t3) reference time to bottom dead center, (Hmg) moving height by gravity, (Hmb) moving height by buoyancy, (Hb) depth of sinking by buoy weight, (Htq) depth of sinking by torque load, (Hadd) depth of sinking by buoy weight and torque load and (Wh) wave height.
Figures 12A, 12B, 12C, 12D, 12E:
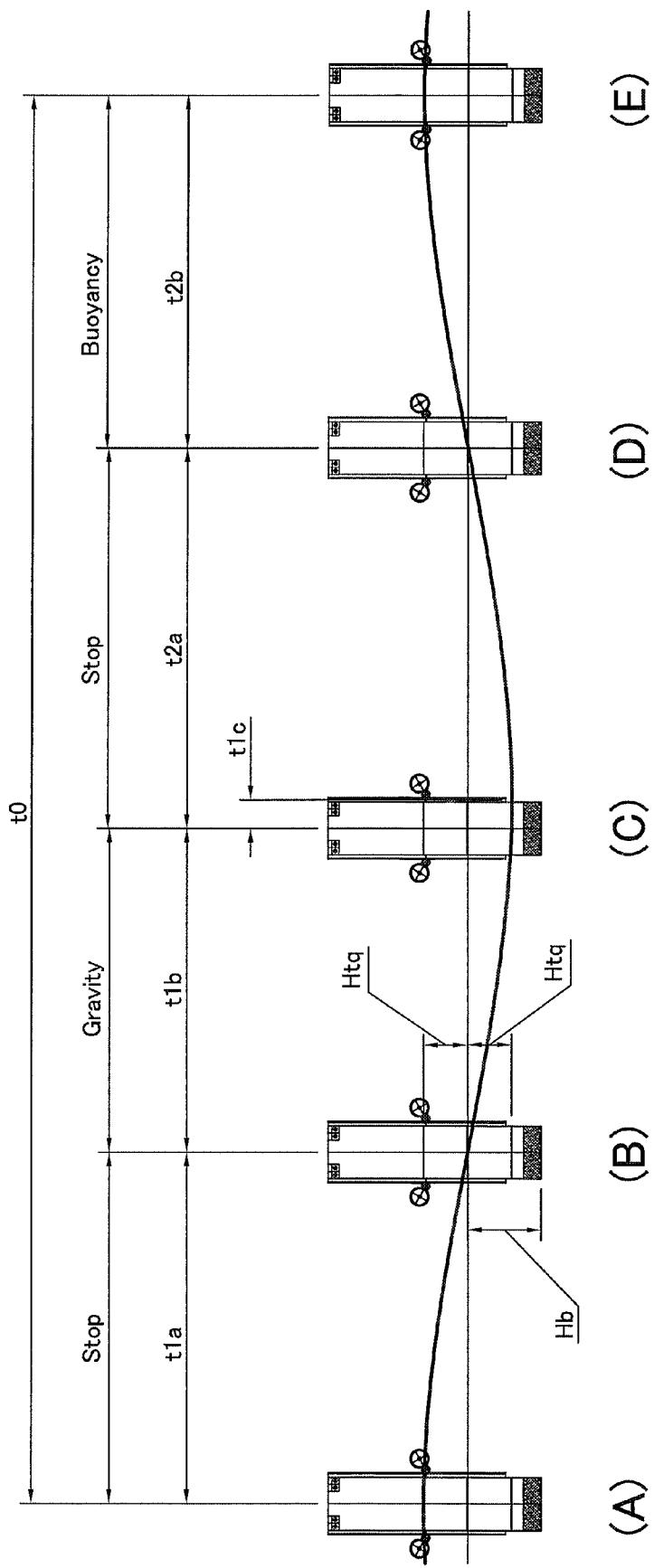
FIGS. 12A-12E show the image chart of the power generation buoy movement with torque load (2800 kgf) in 2500 mm height of ocean wave with the references (t0) cycle of wave, (t1a) period of stop to balance point, (t1b) period of descent, (t2a) period of stop in rise, (t2b) period of rise, (t1c) reference time to bottom dead center, (Hb) depth of sinking by buoy weight, (Htq) depth of sinking by torque load, and (Wh) wave height.
Figures 13A, 13B, 13C, 13D, 13E, 13F:
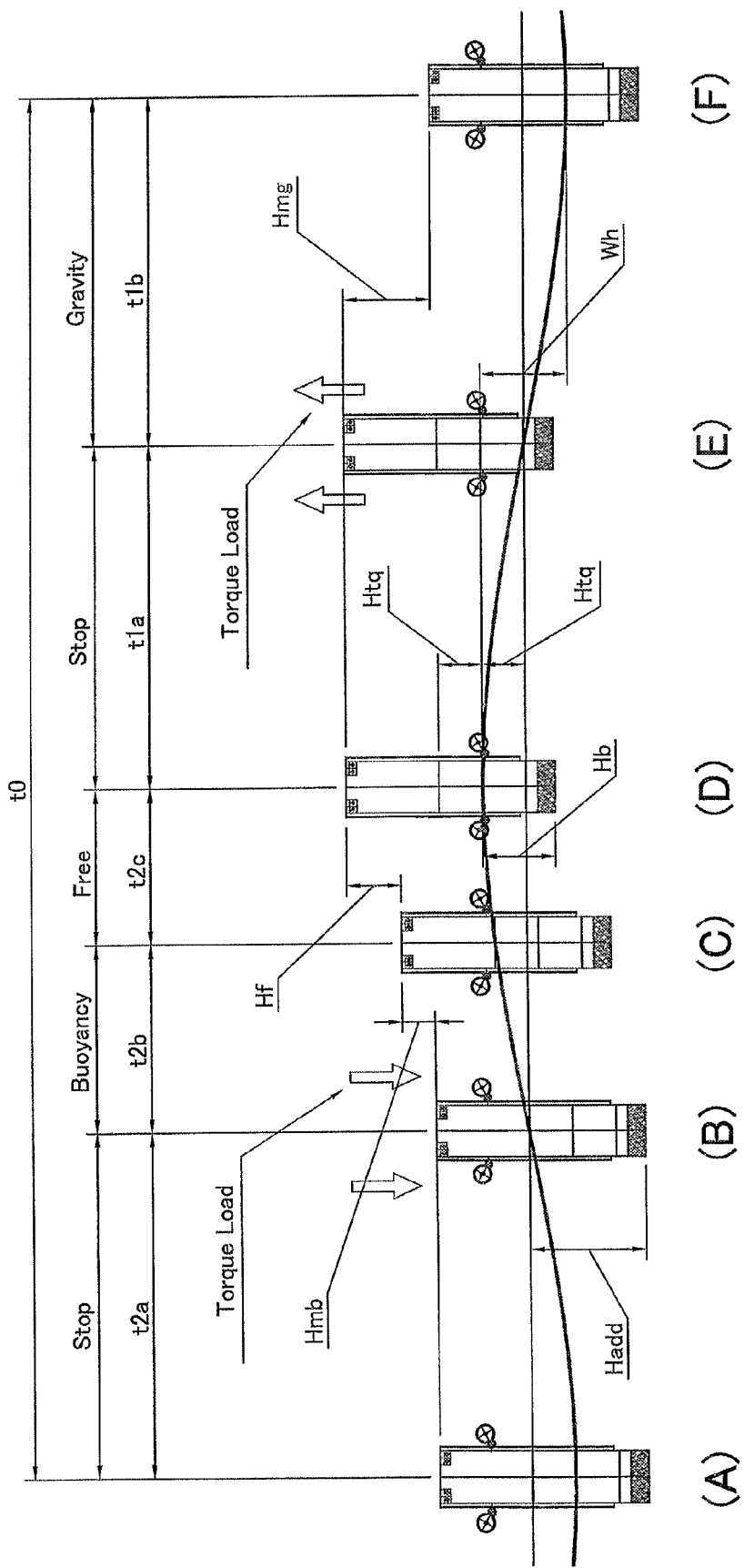
FIGS. 13A-13F show the image chart of the power generation buoy movement by torque load (2800 kgf) with freeing the load at the top dead center in 2500 mm height of ocean wave with the references (t0) cycle of wave, (t1a) period of stop to the balancing point, (t1b) period of descending, (t2a) period of stop in rise, (t2b) period of rising, (t2c) period of free rising to top dead center, (Hmg) moving height by gravity, (Hmb) moving height by buoyancy, (Hf) moving height in free rising, (Hb) depth of sinking by buoy weight, (Htq) depth of sinking by torque load, (Hadd) depth of sinking by buoy weight and torque load and (Wh) wave height.

FIGS. 7A and 7B show a wave activated power generation unit. FIG. 7A shows the power generation buoy in top center of waves. FIG. 7B shows the power generation buoy in the bottom center of waves. Power generation unit is composed of power generation buoy (22) and shroud assembly (23). Rack gear (24) and shuttle slide (29) are installed on power generation buoy (22). Pinion gear (25), gearless transmission (26), dynamo (27), and support roller (28) are installed in the shroud assembly. Power generation unit is fixed both sides by rigid barge (30), and is floating on the sea. Power generation buoy (22) moves up and down in shroud assembly (23).

FIGS. 8A-8E show the image chart, which convert the vertical movement of the power generation buoy into the gyration by rack and pinion mechanism. The rack gear (35), which is attached on the buoy (34), moves up and down because of the vibration of the wave. The pinion gear (36) converts the vertical movement of the rack into the gyration. The pinion gear (36) is attached in a shroud assembly. (The shroud assembly is omitted in the figure.) When the movement is analyzed in physics, the power generation buoy (34) rises by the buoyancy, and descends by gravitation.

Rack and pinion systems are installed in both surfaces of the left and a right of the buoy. Therefore, the hand of cut of the right side pinion is opposite to the left side pinion. The rotation speed of the pinion is varied by the cycle of the wave. When electricity is generated by rotating movement of the pinion, the generated electricity is an exchange current and its frequency is not constant. It is preferable that the current generated by the wave activated power generation is converted into the direct current electricity.

In this invention, the rack and pinion mechanism can convert the vertical movement of the variable wave into the gyration. Of course there is some limitation. The amplitude of the wave at stormy weather has the danger to exceed the length of the rack gear. At stormy weather it is necessary to stop the vertical movement of power generation buoy.

The power generation buoy repeats the vertical movement by the buoyancy and gravity. The pinion gear converts the vertical movement into the gyration. The wave activated power generation unit turns dynamo with the rotating torque of the pinion gear, and obtains the electric power. The rotating torque load of the dynamo is equal to the frictional force for the power generation buoy. The power generation buoy does not fall down by gravitation when the frictional force is larger than the gravity load. The power generation buoy stops the vertical movement in the air. When the pinion gears are connected to the dynamo with the gearless transmission, the torque of the dynamo can be arbitrarily varied. Therefore, it becomes possible to stop the power generation buoy at stormy weather.

The motion of the power generation buoy is simulated by using the sample power generation buoy and ocean wave data. Ocean wave is generated by the wind and gravity. The wave data is observed as a function of the velocity of the wind. Table 2 shows the observational data:

TABLE 2

| Amplitude of wave (m) | Velocity of the wind (m/sec) | Cycle (sec) | Wavelength (m) |
|---|---|---|---|
| 1.5 | 7.07 | 5.7 | 50.00 |
| 2.0 | 8.16 | 6.5 | 66.67 |
| 2.5 | 9.13 | 7.3 | 83.33 |
| 3.0 | 10.00 | 8.0 | 100.00 |
| 3.5 | 10.80 | 8.6 | 116.67 |
| 4.0 | 11.55 | 9.2 | 133.33 |
| 4.5 | 12.25 | 9.8 | 150.00 |
| 5.0 | 12.91 | 10.3 | 166.67 |

FIGS. 9A-9E show the free vibration chart of power generation buoy in 2500 mm height of ocean wave. When the torque load of dynamo does not load, power generation buoy vibrates freely by ocean wave. When wave height (Wh) is 2500 mm, cycle of wave (t0) is 7.30 sec. So, the period of descent (t1) by gravity is 3.65 sec and the period of rise by buoyancy is 3.65 sec. Because the power generation buoy vibrates without load restriction, the moving height by gravity (Hmg) and the moving height by buoyancy (Hmb) are the same as the wave height (Wh).

The length of the power generation buoy is 6,000 mm. The buoyancy of the buoy is calculated to be 13,500 kgf from the volume. Weight material of the buoy is calculated to be 3,222 kgf. The weight force of the iron rubbish is 1,463 kgf. The total weight force is 4,685 kgf (46865=3222+1463), so the depth of sinking by buoy weight (Hb) is about 2,082 mm. The power generation buoy sinks 2,082 mm and stands up vertically in the sea.

Electricity is not generated in the system of FIG. 9A-9E. It is necessary to install the dynamo to generate electricity. The buoy that floats on the ocean wave cannot vibrate freely when the dynamo is installed. The power generation buoy receives the resistance force from the pinion, which corresponds to the torque force turning the dynamo.

FIGS. 10A-10E show the image chart of the power generation buoy movement with torque load (1000 kgf) in 2500 mm height of ocean wave. When wave height (Wh) is 2500 mm, cycle of wave (t0) is 7.30 sec. The pinion load from the dynamo torque load is the same as the frictional force for the buoy. The buoy does not rise when the buoyancy of the buoy does not reach 1000 kgf. Similarly the buoy does not descend if the buoyancy of the buoy does not lose 1000 kgf or more. The pinion load becomes 500 kgf because there are two dynamos.

The depth of sinking by buoy weight (Hb) is 2082 mm. The depth of sinking by torque load (Htq) is 444 mm. The depth of sinking by buoy weight and torque load (Hadd) is 2526 mm. The period of stop in descent (t1a) is calculated to be 1.47 sec. The period of descent (t1b) is calculated to be 2.18 sec. The period of stop in rise (t2a) is calculated to be 0.98 sec. The period of rise (t2b) is calculated to be 2.67 sec. The moving height by gravity (Hmg) is calculated to be 2056 mm. The moving height by buoyancy (Hmb) is calculated to be 2056 mm. The data of the torque load and the buoy assembly is shown in Table 3:

TABLE 3

| Size of Buoy (mm) | Weight of Buoy (kgf) | Depth of Sinking by Buoy Weight (mm) | Torque Load (kgf) | Depth of Sinking by Torque Load (mm) |
|---|---|---|---|---|
| 1500 × 1500 × 6000 | 4685 | 2082 | 1000 | 444 |

Analysis of movement at 2500 mm height, torque load 1000 kgf

1. Analysis of movement by buoyancy
   (A) The buoyancy acts at the cycle from the bottom dead center (C) of the wave to the top dead center (E).
   (B) When there is a torque load, the buoy does not move from the bottom dead center (C) until the buoyancy exceeds the torque load.
   (C) The torque load and the buoyancy are balanced at the point (D).
   (D) Then, the buoy rises from point (D) to the top dead center (E).
   (E) The total buoyancy of the buoy is 13500 kgf, so the buoy buoyancy is much larger than 1000 kgf of the torque load. Therefore, the buoy rises from point (D) to the top dead center (E) without fail.
2. Movement analysis-1 by gravity
   (A) The gravity acts at the cycle from the top dead center (A) of the wave to the bottom dead center (C).
   (B) When there is a torque load, the buoy does not move from the top dead center (A) until the buoyancy loses the force corresponding to the torque load.
   (C) The torque load and the buoyancy are balanced at the point (B).
   (D) Then, the buoy descends from the point (B) to the bottom dead center (C).
   (E) The total weight of the buoy is 4685 kgf, so the buoy gravity is larger than 1000 kgf of the torque load. Therefore, the buoy descends from the point (B) to the bottom dead center (C).
3. Movement analysis-2 by gravity
   (A) The buoy should fall down from point (B) to the bottom dead center (C) within 2.18 seconds (t1b). Otherwise, next wave comes.
   (B) The gravity increases from 0 kgf of point (B) to 3685 kgf (3685=4685−1000) of point (C). The buoyancy that corresponds to gravity (3685 kgf) is 1638 mm. The gravity of 1842.5 kgf acts on the average.
   (C) The mass of the buoy is 4685 kg. In the equation of Newton, it is F=mα. Therefore it is 1842.5(kgf)=4685 (kg)*α
   (D) α=0.3932764 (kgf/kg), 1 kgf=9.81N, 1N=1(kg)*1(m/sec^2), α=0.3932764*9.81 (N/kg)=3.85804 (N/kg) =3.85804 (m/sec^2)

(E) $S=(½)*α*t^2$, $α=3.85804$ (m/sec^2), $t1b=2.18$(sec)
(F) $S=(½)*3.85804$(m/sec^2)*2.18(sec)*2.18(sec) $=9.16747$(m)=9167.47(mm)
(G) The falling distance from point (B) to point (C) is 2056 mm (Hmg).
(H) The calculated distance (9167 mm) is larger than 2056 mm (Hmg). Therefore; the buoy will fall down from the point (B) to the point (C) without fail.

4. Actual movement

This calculation is considerably rough. The viscosities etc. of seawater are not considered. Because the buoy receives the torque load in the neighborhood of the bottom dead center, the buoy will stabilize in the neighborhood of the bottom dead center. It is impossible to get the stability point by the hand calculation.

Calculation of work and work rate at 2500 mm height, torque load 1000 kgf:

1. Work by buoyancy
   (A) Work by the buoyancy is obtained by multiplying the torque load and the vertical distance between the point (D) and the point (E).
   (B) The torque load is 1000 kgf, and the distance is 2056 mm (Hmb).
   (C) Therefore, the work by buoyancy: Wb=1000(kgf)*(2056/1000)(m)=2056.0 (kgf*m)

2. Work by gravity
   (A) Work by the gravity is obtained by multiplying the torque load and the vertical distance between the point (B) and the point (C).
   (B) The torque load is 1000 kgf, and the distance is 2056 mm (Hmg).
   (C) Therefore, the work by gravity: Wg=1000(kgf)*(2056/1000)(m)=2056.0 (kgf*m)

3. Total Work
   (A) The total work (Wt) is obtained by adding the work by buoyancy (Wb) and work by gravity (Wg).
   (B) Wb=2056.0 (kgf*m), Wg=2056.0 (kgf*m)
   (C) Therefore, the total work: Wt=2056.0 (kgf*m)+2056.0 (kgf*m)=4112.0 (kgf*m)

4. Work rate
   (A) Work by buoyancy (Wb) and work by gravity (Wg) are repeated at the cycle of wave.
   (B) Therefore, the total work rate is obtained by dividing the total work by the cycle of wave.
   (C) Total work is 4112.0 kgf*m, and the cycle of the wave is 7.30 seconds.
   (D) Total work rate: Wr=4112.0(kgf*m)/7.30(sec)=563.28 (kgf*m/sec)
   (E) 1(kgf*m/sec)=9.81(W)=0.00981(kW)
   (F) Therefore, Wr=563.28*0.00981(kW)=5.525(kW)

FIGS. 11A-11F show the image chart of the power generation buoy movement with torque load (2500 kgf) in 2500 mm height of ocean wave. When wave height (Wh) is 2500 mm, cycle of wave (t0) is 7.30 sec. The pinion load from the dynamo torque load is the same as the frictional force for the buoy. The buoy does not rise when the buoyancy of the buoy does not reach 2500 kgf. Similarly the buoy does not descend if the buoyancy of the buoy does not lose 2500 kgf or more.

The depth of sinking by buoy weight (Hb) is 2082 mm. The depth of sinking by torque load (Htq) is 1111 mm. The depth of sinking by buoy weight and torque load (Hadd) is 3193 mm. The period of stop to balance point (t1a) is calculated to be 1.69 sec. The period of stop in descent (t1b) is calculated to be 1.20 sec. The period of descent (t1c) is calculated to be 1.11 sec. The period of stop in rise (t2a) is calculated to be 1.42 sec. The period of rise (t2b) is calculated to be 1.87 sec. The reference time (t3) from descending point to bottom dead center is 0.76 sec. The moving height by gravity (Hmg) is calculated to be 1389 mm. The moving height by buoyancy (Hmb) is calculated to be 1389 mm. The data of the torque load and the buoy assembly is shown in Table 4:

TABLE 4

| Size of Buoy (mm) | Weight of Buoy (kgf) | Depth of Sinking by Buoy Weight (mm) | Torque Load (kgf) | Depth of Sinking by Torque Load (mm) |
| --- | --- | --- | --- | --- |
| 1500 × 1500 × 6000 | 4685 | 2082 | 2500 | 1111 |

Analysis of movement at 2500 mm height, torque load 2500 kgf

1. Movement analysis by buoyancy
   (A) The torque load and the buoyancy are balanced at the point (E). Then, the buoy rises from point (E) to the top dead center (F).
   (B) The total buoyancy of the buoy is 13500 kgf, so the buoy buoyancy is much larger than 2500 kgf of the torque load. Therefore, the buoy rises from point (E) to the top dead center (F) without fail.

2. Movement analysis-1 by gravity
   (A) The torque load and the buoyancy are balanced at the point (C). Point (B) is the reference point on which the weight of the buoy and the buoyancy is balancing.
   (B) Then, the buoy descends from the point (C) to the bottom center. It is 0.76 seconds (t3) from point (C) to the bottom center. And the distance corresponding 0.76 sec is 833 mm.
   (C) The point (D) is neighborhood of the bottom center.
   (D) The total weight of the buoy is 4685 kgf, so the buoy gravity is larger than 2500 kgf of the torque load. Therefore, the buoy descends from the point (C) to the bottom center.

3. Movement analysis-2 by gravity
   (A) The gravity force increases from 0 kgf of point (C) to 2185 (2185=4685−2500) kgf of the bottom center. The gravity force of 1092.5 kgf acts on the average.
   (B) The mass of the buoy is 4685 kg. F=mα. Therefore it is 1092.5(kgf)=4685(kg)*α
   (C) α=0.233191 (kgf/kg)=0.233191*9.81(N/kg)=2.28760 (m/sec^2)
   (D) $S=(½)*α*t^2$, $α=2.28760$(m/sec^2), $t1c=1.11$(sec), It is 1.11 sec from point (C) to point (D).
   (E) $S=(½)*2.28760$(m/sec^2)*1.11 (sec)*1.11 (sec) $=1.4092$(m)=1409.2(mm)
   (F) The vertical distance from point (C) to point (D) is 1409.2 mm, 1409 mm and 833 mm are numerical values that are very near. The buoy will stabilize in the neighborhood of the bottom center (D). It is impossible to get the stability point by the hand calculation.

Calculation of work and work rate at 2500 mm height, torque load 2500 kgf

1. Work by buoyancy
   (A) The torque load is 2500 kgf, and the distance is 1389 mm Hmb).
   (B) Therefore, the work by buoyancy: Wb=2500(kgf)*(1389/1000)(m)=3472.5 (kgf*m)

2. Work by gravity
   (A) The torque load is 2500 kgf, and the distance is 1389 mm (Hmg).
   (B) Therefore, the work by gravity: Wg=2500(kgf)*(1389/1000)(m)=3472.5 (kgf*m)

3. Total Work; Wt=3472.5 (kgf*m)+3472.5 (kgf*m)=6945.0 (kgf*m)

4. Work rate
   (A) The total work rate is obtained by dividing the total work by the cycle of wave.
   (B) Total work is 6945.0 kgf*m, and the cycle of the wave is 7.3 seconds.
   (C) Total work rate: Wr=6945.0(kgf*m)/7.3(sec) =951.3698 (kgf*m/sec)
   (D) 1(kgf*m/sec)=9.81(W)=0.00981(kW)
   (E) Wr=951.3698*0.00981(kW)=9.33(kW)

The optimization of the torque load is a difficult problem. In the calculation, the torque load that becomes ½ of the height of waves obtains the maximum efficiency. However, the power generation buoy comes not to descend easily by gravity when the torque load becomes large.

The buoyancy that corresponds to the torque load 2800 kgf is 1244 mm. The buoyancy that corresponds to weight (4685 kgf) of the buoy is 2082 mm. The total load that adds torque force (2800 kgf) to weight (4685 kgf) of the buoy is 7485 kgf. The buoyancy that corresponds to the total load (7485 kg) is 3326 mm. The data of the torque load and the buoy assembly is shown in Table 5:

TABLE 5

| Size of Buoy (mm) | Weight of Buoy (kgf) | Depth of Sinking by Buoy Weight (mm) | Torque Load (kgf) | Depth of Sinking by Torque Load (mm) |
|---|---|---|---|---|
| 1500 × 1500 × 6000 | 4685 | 2082 | 2800 | 1244 |

FIGS. 12A-12E show the image chart of the power generation buoy movement with torque load (2800 kgf) in 2500 mm height of ocean wave. When wave height (Wh) is 2500 mm, cycle of wave (t0) is 7.30 sec. The pinion load from the dynamo torque load is the same as the frictional force for the buoy. The buoy does not rise when the buoyancy of the buoy does not reach 2800 kgf. Similarly the buoy does not descend if the buoyancy of the buoy does not lose 2800 kgf or more.

The depth of sinking by buoy weight (Hb) is 2082 mm. The depth of sinking by torque load (Htq) is 1244 mm. The depth of sinking by buoy weight and torque load (Hadd) is 3193 mm. The period of stop to balance point (t1a) is calculated to be 1.69 sec. The period of stop in descent (t1b) is calculated to be 1.68 sec. The period of descent (t1c) is calculated to be 0.15 sec. The period of stop in rise (t2a) is calculated to be 1.97 sec. The period of rise (t2b) is calculated to be 1.83 sec. Gravity begins to act from the point (C). However, it is only 0.15 second to the bottom dead center. It is thought that the power generation buoy does not move when the torque load is 2800 kgf. In this case, it is impossible to get the answer by the hand calculation.

FIGS. 13A-13F show the image chart of the power generation buoy movement by torque load (2800 kgf) with freeing the load at the top dead center in 2500 mm height of ocean wave. When the wave height (Wh) is 2500 mm, the cycle of wave (t0) is 7.30 sec. The period of stop to the balancing point (t1a) is calculated to be 1.81 sec. The period of descending (t1b) is calculated to be 1.84 sec. The period of stop in rise (t2a) is calculated to be 1.83 sec. The period of rising (t2b) is calculated to be 1.00 sec. The period of free rising (t2c) to top dead center is calculated to be 0.82 sec. The moving height by gravity (Hmg) is calculated to be 2500 mm. The moving height by buoyancy (Hmb) is calculated to be 930 mm. The moving height in free rising (Hf) is calculated to be 1570 mm. The depth of sinking by buoy weight (Hb) is calculated to be 2082 mm. The depth of sinking by torque load (Htq) is calculated to be 1244 mm. The depth of sinking by buoy weight and torque load (Hadd) is calculated to be 3326 mm.

The power generation buoy is assumed to be stopping at the bottom dead center (A). The frictional force does not act on the object that is stopping. Similarly, the torque load does not act on the power generation buoy that is stopping. The power generation buoy does not rise until the buoyancy exceeds the torque load though the power generation buoy obtains the buoyancy as the wave rises.

Buoyancy acts from the point (A) to the point (D). The torque load and the buoyancy do the balance in point (B). When the power generation buoy exceeds the point (B), it rises with turning the dynamo. The torque load is freed a few seconds before the top dead center (D). Point (C) is the point to free the torque load. The weight of power generation buoy and the buoyancy do the balance when the torque load is freed at the point (D). The potential energy of the power generation buoy at the point (D) recovers greatly though power generation is not done from the point (C) to the point (D).

Gravity acts from the point (D) to the point (F). When gravity is larger than the torque loads, the power generation buoy goes down to the bottom dead center (F). The torque load and the buoyancy do the balance in point (E). When the power generation buoy exceeds the point (E), it descends with turning the dynamo. And, the weight of the power generation buoy and the buoyancy do the balance, and the power generation buoy stabilizes in neighborhood of the bottom dead center (F). The dynamo generates electricity from the point (D) to the point (F) by gravitation.

Analysis of movement at 2500 mm height, torque load (2800 kgf) with freeing the load at the top dead center 1. Movement analysis by buoyancy-1
   (A) Buoyancy acts from the point (A) to the point (D).
   (B) The torque load and the buoyancy do the balance in point (B).
   (C) When the power generation buoy exceeds the point (B), it rises with turning the dynamo.
   (D) The torque load is freed 0.82 seconds (t2c) before the top dead center (D). Point (C) is the point to free the torque load.
   (E) The weight of power generation buoy and the buoyancy do the balance because the torque load is freed.
   (F) The potential energy of the power generation buoy at the point (D) recovers greatly though power generation is not done from the point (C) to the point (D).

2. Movement analysis by buoyancy-2
   (A) The torque load is freed 0.82 seconds (t2c) before the top dead center (D).
   (B) The power generation buoy receives the force corresponding to the opened torque load (2500 kgf).
   (C) It is 0.82 seconds (t2c) from point (C) to point (D).
   (D) The mass of the buoy is 4685 kg. F=mα. Therefore it is 2500(kgf)=4685(kg)*α
   (E) α=0.53367 (kgf/kg)=0.53367*9.81(N/kg)=5.23535 (m/sec^2)
   (F) S=(½)*α*t^2, α=5.23535(m/sec^2), t2c=0.82(sec)
   (G) S=(½)*5.23535(m/sec^2)*0.82(sec)*0.82(sec) =1.8033(m)=1803.3(mm)
   (H) The rising distance from point (C) to point (D) is 1570 mm (Hmf). The calculated distance (1803 mm) is larger than 1570 mm (Hmf). Therefore the power generation buoy will stabilize in the neighborhood of the top dead center (D). It is impossible to get the stability point by the hand calculation.

3. Movement analysis-1 by gravity
   (A) Gravity acts from the point (D) to the point (F).

(B) When gravity (4685 kgf) is larger than the torque loads (2800 kgf), the power generation buoy goes down to the bottom dead center (F).
(C) The torque load and the buoyancy do the balance in point (E).
(D) When the power generation buoy exceeds the point (E), it descends with turning the dynamo.
(E) The weight of the power generation buoy and the buoyancy do the balance, and the power generation buoy stabilizes in neighborhood of the bottom dead center (F).
(F) The dynamo generates electricity from the point (D) to the point (F) by gravitation.

4. Movement analysis-2 by gravity
(A) The gravity force increases from 0 kgf of point (E) to 1885 (1885=4685−2800) kgf of the bottom center. The gravity force of 942.5 kgf acts on the average.
(B) The mass of the buoy is 4685 kg. F=mα. Therefore it is 942.5(kgf)=4685(kg)*α
(C) α=0.201174 (kgf/kg)=0.201174*9.81(N/kg) =1.973516(m/sec^2)
(D) S=(½)*α*t^2, α=1.973516(m/sec^2), t1b=1.84(sec), It is 1.84 sec from point (E) to point (F).
(E) S=(½)*1.973516(m/sec^2)*1.84(sec)*1.84(sec) =3.3476(m)=3347.6(mm)
(F) The falling distance from point (E) to point (F) is 2500 mm (Hmg). The calculated distance (3347 mm) is larger than 2500 mm (Hmg). The buoy will stabilize in the neighborhood of the bottom dead center (F). It is impossible to get the stability point by the hand calculation.

Calculation of work and work rate at 2500 mm height, torque load (2800 kgf) with freeing the load at the top dead center 1. Work by buoyancy
(A) The torque load is 2800 kgf, and the distance is 930 mm (Hmb).
(B) The work by buoyancy: Wb=2800(kgf)*(930/1000)(m)=2604.0 (kgf*m)

2. Work by gravity
(A) The torque load is 2800 kgf, and the distance is 2500 mm (Hmg).
(B) The work by gravity: Wg=2800(kgf)*(2500/1000)(m) =7000.0 (kgf*m)
(c) Total Work; Wt=2604.0 (kgf*m)+7000.0 (kgf*m) =9604.0 (kgf*m)

3. Work rate
(A) The total work rate is obtained by dividing the total work by the cycle of wave.
(B) Total work is 9604.0(kgf*m), and the cycle of the wave is 7.30 sec (t0).
(C) Total work rate: Wr=9604.0(kgf*m)/7.3(sec)=1315.6 (kgf*m/sec)
(D) 1(kgf*m/sec)=9.81(W)=0.00981(kW)
(E) Wr=1315.6*0.00981(kW)=12.90 (kW)

When the method of controlling in FIG. 13A-13F is used, the wave activated power generation can be driven by the most efficient torque load. The power generation ability by torque load 2500 kgf is 9.33 kW, and the power generation ability by torque load 2800 kgf is 12.90 kW. 12.90 kW is 1.38 times 9.33 kW. The torque load can be varied with the gearless transmission. If the clutch mechanism is used, the torque load can be easily made free. Both methods are the same in using the rack and pinion and gearless transmission.

The power generation buoy does not descend by gravity when the torque load becomes larger than the weight of the power generation buoy. At stormy weather, the power generation buoy can be stopped by this method.

Because the calculation becomes complex, the following calculations are calculated by the method of uniform torque load. Table 6 shows the forecast of the power generation ability calculated by the method of the uniform torque load as shown below:

TABLE 6

| Amplitude of wave (m) | Torque Load (kgf) | Moving range (mm) | Work rate (kW) |
|---|---|---|---|
| 1.5 | 1500 | 833 | 4.30 |
| 2.5 | 2500 | 1389 | 9.33 |
| 3.5 | 3300 | 2033 | 15.30 |
| 4.5 | 4700 | 0 | 0.00 |

The incidence of the wave in North Ocean is assumed as shown in Table 7:

TABLE 7

| Amplitude of wave (m) | Average (m) | Incidence per year (%) | Incidence per year Days | Time/year (Hours) |
|---|---|---|---|---|
| 1.0~2.0 | 1.5 | 10 | 36.5 | 876 |
| 2.0~3.0 | 2.5 | 40 | 140.0 | 3504 |
| 3.0~4.0 | 3.5 | 40 | 140.0 | 3504 |
| 4.0~more | 4.5 | 10 | 36.5 | 876 |

Power generation (kW) in this sample unit is calculated as shown in Table 8:

TABLE 8

| Amplitude of Wave (m) | Torque Load (kgf) | Range of Movement (mm) | Work Rate (kW) | Efficiency of Dynamo (%) | Rate of Incidence (%) | Amount of Power Generation (kW) |
|---|---|---|---|---|---|---|
| 1.5 | 1500 | 833 | 4.30 | 80 | 10 | 0.34 |
| 2.5 | 2500 | 1389 | 9.33 | 80 | 40 | 2.99 |
| 3.5 | 3300 | 2033 | 15.30 | 80 | 40 | 4.80 |
| 4.5 | 4700 | 0 | 0.00 | 80 | 10 | 0.00 |
| Amount of Power Generation (kW) | | | | | | 8.13 |

The amount of power generation (kW*h/year) during year in this sample wave activated power generation unit is calculated as shown in Table 9:

TABLE 9

| Amplitude of Wave (m) | Torque Load (kgf) | Range of Movement (mm) | Work Rate (kW) | Efficiency of Dynamo (%) | Time/Year (Hour) | Amount of Power Generation (kW * h/year) |
|---|---|---|---|---|---|---|
| 1.5 | 1500 | 833 | 4.30 | 80 | 876 | 3,013 |
| 2.5 | 2500 | 1389 | 9.33 | 80 | 3504 | 27,696 |
| 3.5 | 3300 | 2033 | 15.30 | 80 | 3504 | 42,889 |
| 4.5 | 4700 | 0 | 0.00 | 80 | 876 | 0 |
| Amount of Power Generation (kW * h/year) | | | | | | 75,598 |

Figure 14A:
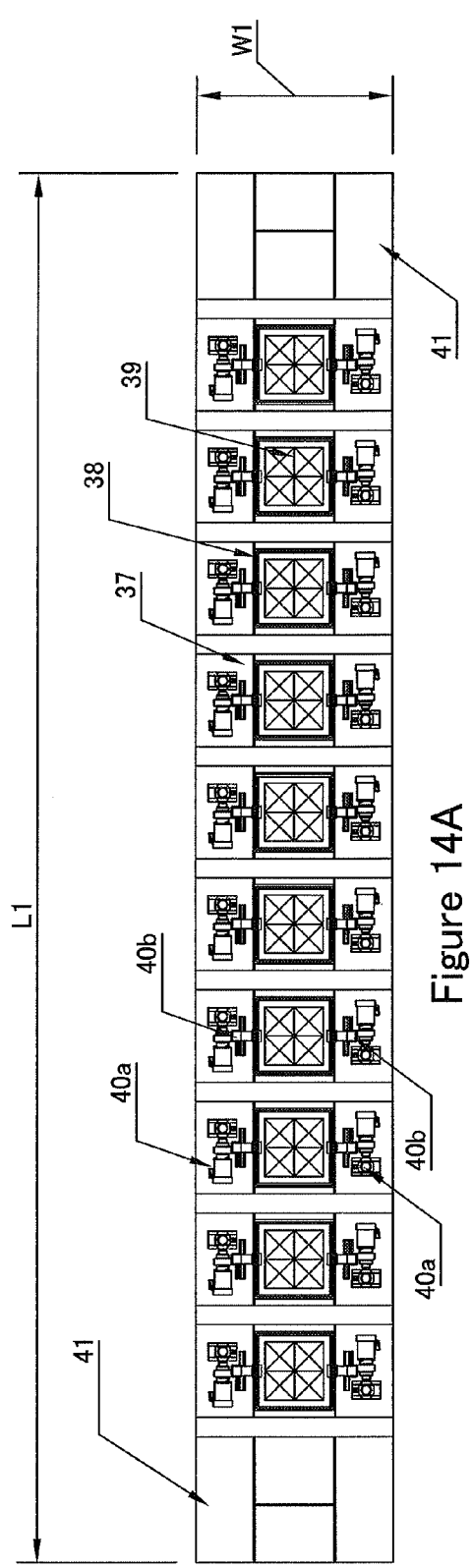
FIGS. 14A-14B show the image chart of the wave activated power generation module with the references (37) power generation unit, (38) shroud assembly, (39) power generation buoy, (40a) dynamo assembly, (40b) gearless transmission assembly, (41) rigid barge, (L1) length of module, (W1) width of module and (H1) height of module.
Figure 14B:
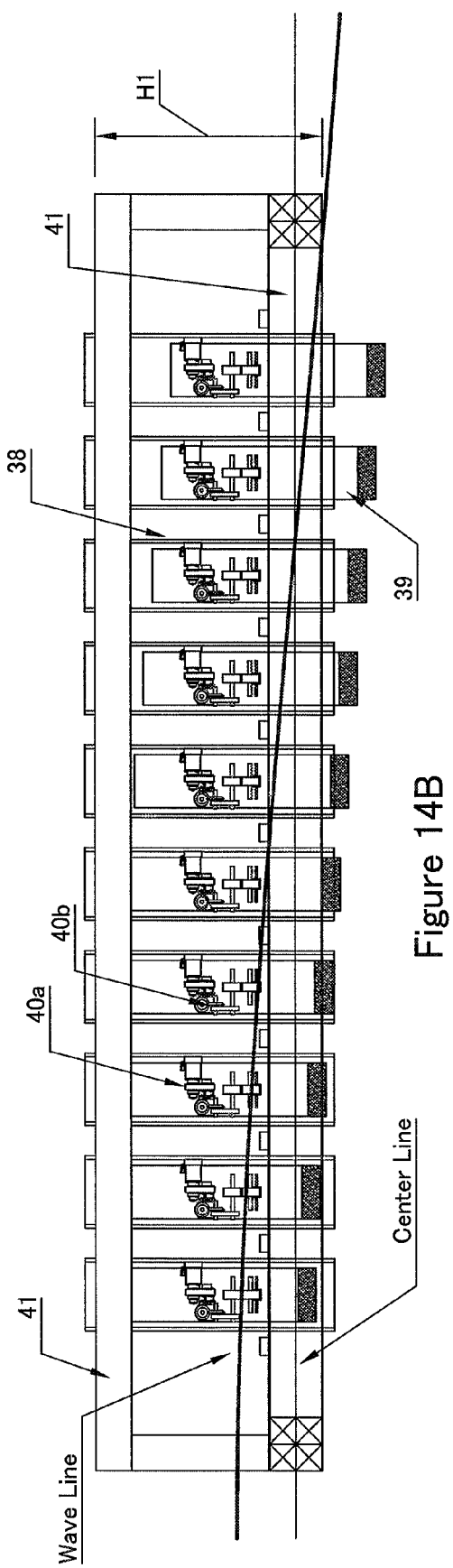

FIGS. 14A-14B show the image chart of the wave activated power generation module. The power generation unit (37) is composed of the shroud assembly (38), the power generation buoy (39), the dynamo assembly (40a) and the gearless transmission assembly (40b). Wave activated power generation module is produced by connecting a lot of power generation units to the straight line by rigid barge (41). In this example, the length of module (L1) is about 36 meters. The width of module (W1) is about 5.1 meters. The height of module (H1) is about 6.3 meters.

The module is produced like the bar in which the rigidity is high. It is desirable that the power generation module is manufactured at the factory. Therefore, the longitudinal length is limited by the size of the manufacturing factory. The power generation module in this image chart is composed by 10 power generation units.

Figure 15:
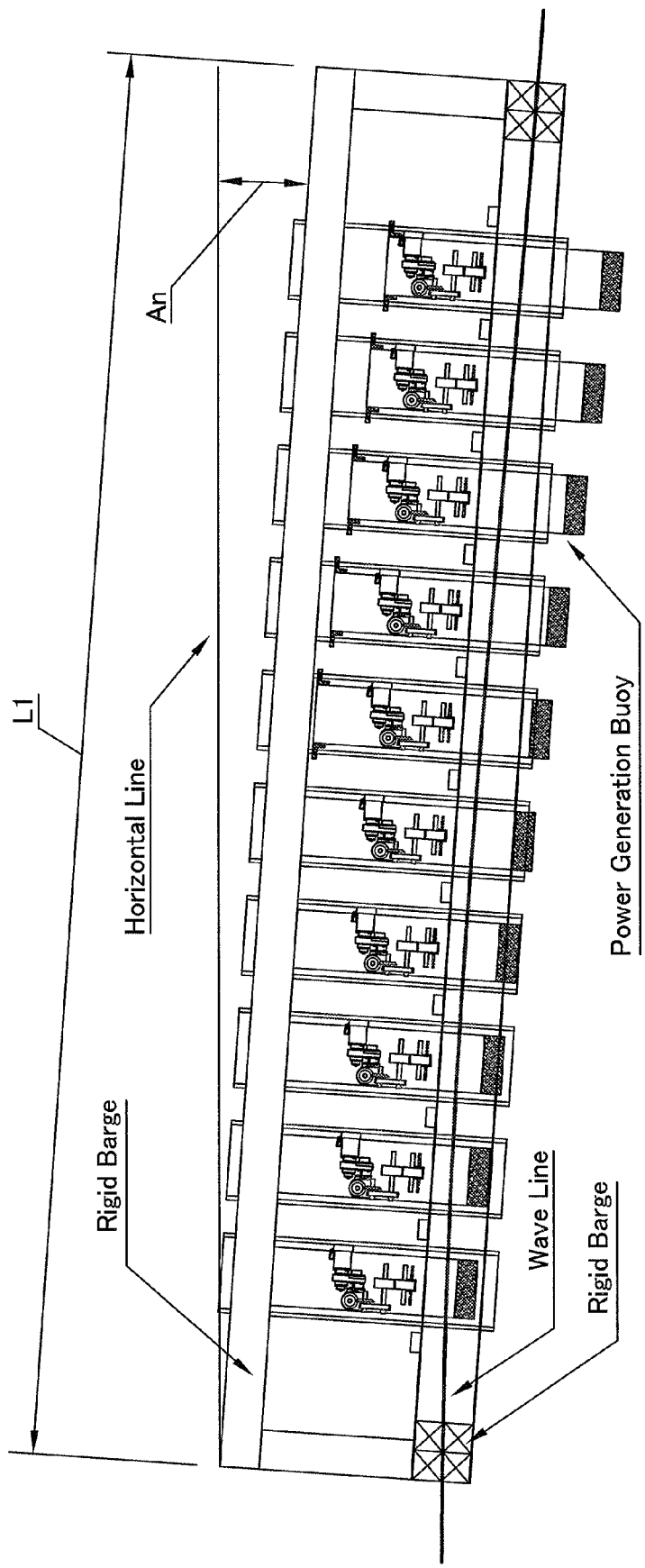
FIG. 15 shows the image chart of the wave activated power generation module inclined by the wave with the references (L1) Length of module and (An) inclined angle.

FIG. 15 shows the image chart of the wave activated power generation module inclined by the wave. The wavelength of the wave of 3.0 m in pulse height is 100 meters. The power generation module is inclined by the buoyancy of wave when the length of the power generation module is shorter than that of wavelength. It is not preferable that the length of the power generation module is shorter than the wavelength of the wave. In this sample chart, the length of module (L1) is 36 meters. The inclined angle (An) is 4.0 degrees.

FIGS. 16A and 16B show the image chart of long size wave activated power generation module. The long size wave activated power generation module is a combined one of two power generation modules. The length of single module (L1) is 36 meters. And the (L2) length of double module (L2) is 72 meters. The long size power generation module in the sample chart has 20 power generation units (43). Rigid barges (42) support both sides of power generation module. The power generation units (43) is composed of shroud assembly (45) and power generation buoy (44). The power generation buoy (44) moves up and down with ocean wave inside the shroud assembly (45).

It is not realistic to manufacture 100 m in length power generation module in one unit. Two power generation modules of 36 m in length are connected, and the long size power generation module is 72 m in length. The long size power generation module will not be inclined greatly by 100 m wavelengths.

Figure 17:
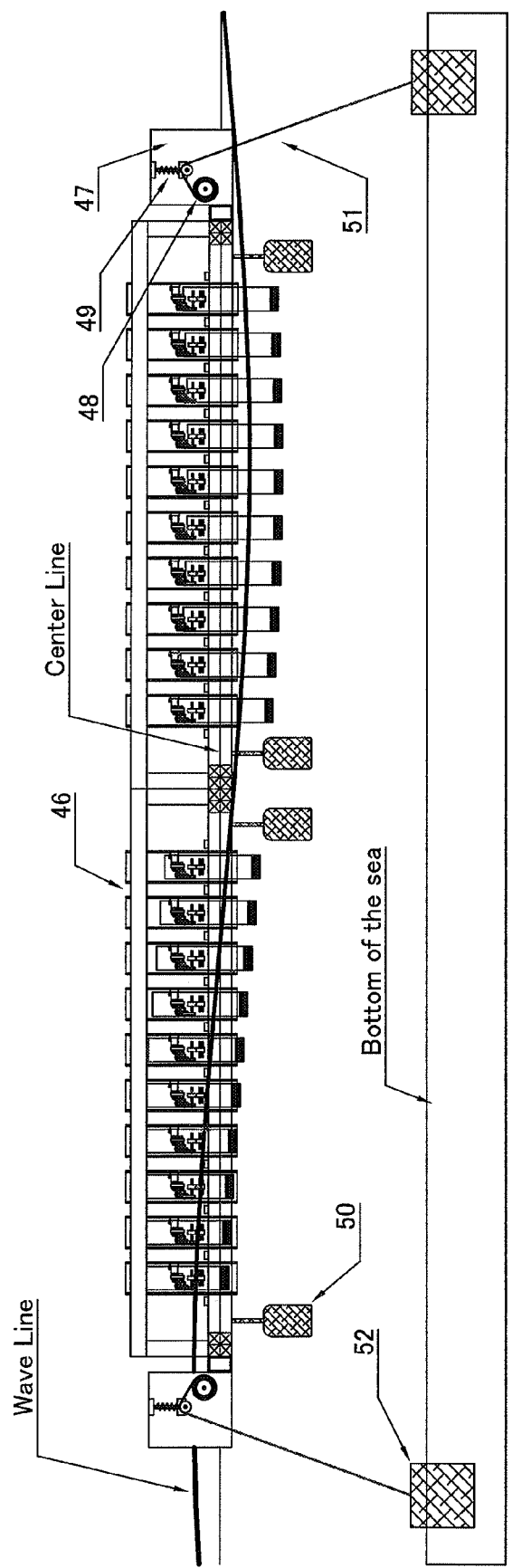
FIG. 17 shows the image chart of the tension buoy and dumping weight for power generation module with the references (46) long size power generation module, (47) tension buoy, (48) cable drum, (49) tension spring, (50) dumping weight, (51) connecting cable, (52) foundation block, (Lb) length of barge and (Wb) width of barge.

FIG. 17 shows the image chart of the tension buoy and dumping weight for power generation module. Long size wave activated power generation module (46) is a combined one of two power generation modules. Dumping weight (50) is hung down on the long size power generation module (46). Tension buoy (47) is floating on the sea and is connected to foundation block (52) buried in the bottom of the sea with connecting cable (51). The connecting cable (51) always connects the tension buoy (47) and the foundation block (52) with constant tension. The constant tension is adjusted by tension spring (49) and cable drum (48).

In rack and pinion method, the power generation energy is obtained from the relative movement of shroud assembly and power generation buoy. The power generation buoy always synchronizes with the wave. When the shroud assembly is floating on the sea, it is inevitable to move up and down by the wave. The power generation efficiency worsens when the shroud assembly and the power generation buoy synchronize at the same time. It is necessary to restrain the shroud assembly when we adopt the rack and pinion method in practical use.

It is easy to connect the shroud assembly to the foundation block buried in bottom of the sea with cable. However, this method has some faults. There are a flood tide and an ebb tide in the sea. The cable loosens at the ebb tide when the length of the cable is matched to the surface of the sea of the flood tide. Oppositely, the cable is cut by the tension at the flood tide when the length of the cable is matched to the surface of the sea of the ebb tide. Moreover, the height of the wave is not constant.

The power generation energy is obtained from the relative movement between the shroud assembly and the power generation buoy. It is useless work to manage the absolute position of the shroud assembly. The purpose can be achieved by shifting the phase of movement. Seawater has the viscosity. The phase of the buoy and the shroud assembly shifts by installing the dumping weight to the power generation module.

However, the power generation module should be connected to the bottom of the sea with cable. Otherwise, the power generation module drifts by the wave. A pair of tension buoy is installed at both ends of the power generation module. The tension buoy is connected to the foundation block in the bottom of the sea, and is floating on the sea. In the tension buoy, there is a mechanism that constantly controls the cable tension. The tension mechanisms are composed of the motor drum that winds up the cable and the tension spring that gives cable the tension. The magnitude of the tension is calculated from the buoyancy of the barge. The cable becomes long by the control program at high water. Oppositely, the cable shortens at low water. At stormy weather, the cable tension in leeward is freed. Though the power generation efficiency of the power generation module deteriorates, the power generation module is prevented being damaged.

Figure 18:
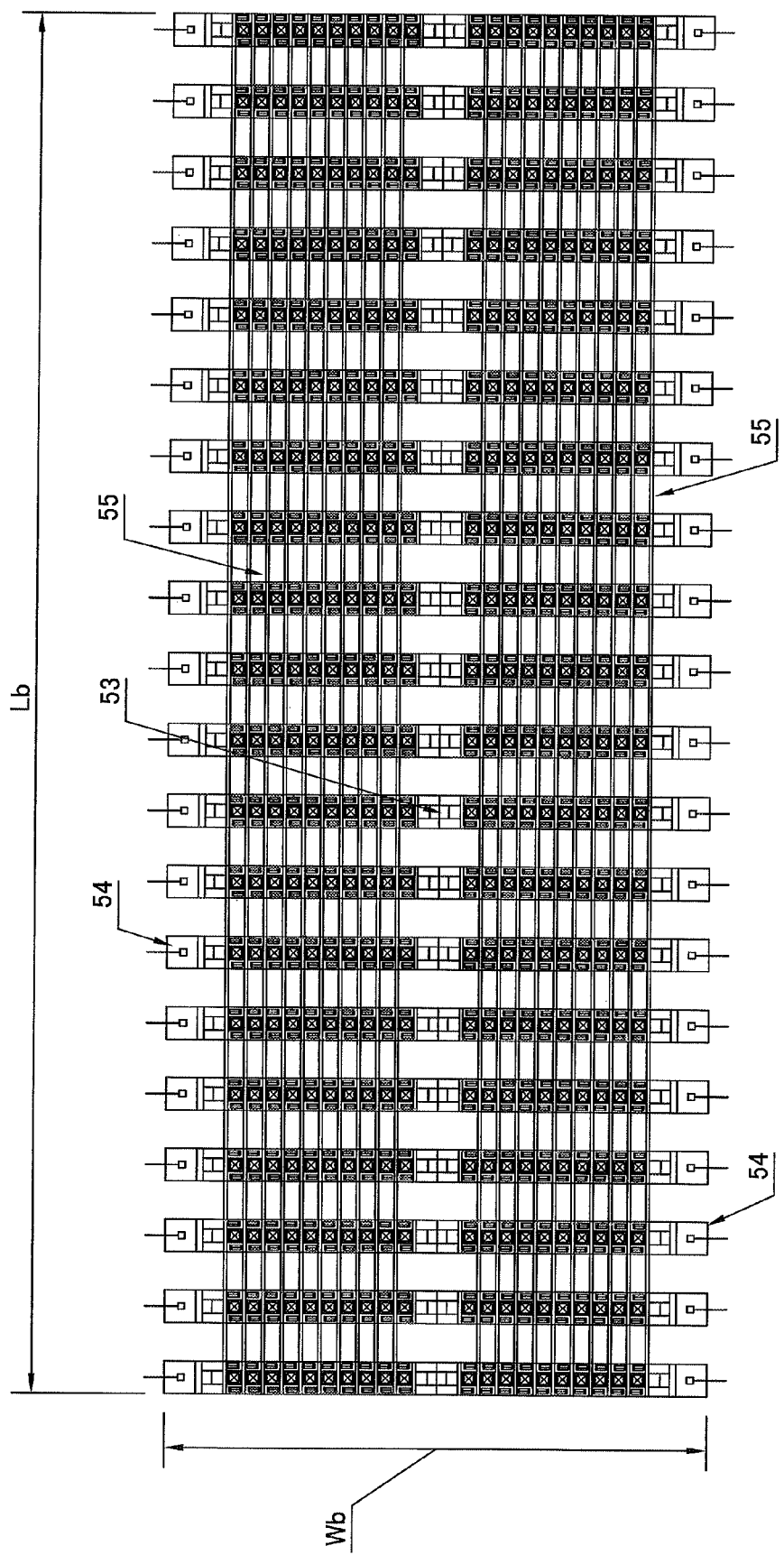
FIG. 18 shows the image chart of the wave activated power generation barge with the references (53) long size power generation module, (54) tension buoy and (55) tying cable.

FIG. 18 shows the image chart of the wave activated power generation barge. The wave activated power generation barge is composed of a lot of long size power generation modules (53) connected with a lot of tying cables (55). A pair of tension buoy (54) is installed at both ends of the long size power generation module (53). In this sample chart, the length of barge (Lb) is 215 meters. And the width of barge (Wb) is 84 meters.

The wave activated power generation barge in sample chart is composed of 20 power generation modules and is composed of 400 power generation units. The barge is side by side connected by a lot of tying cables. The wave activated power generation barge is produced like a carpet with high flexibility. Each power generation module is almost independent. The wave activated power generation barge is constructed on open sea. There is little limitation in the length of barge.

Figure 19:
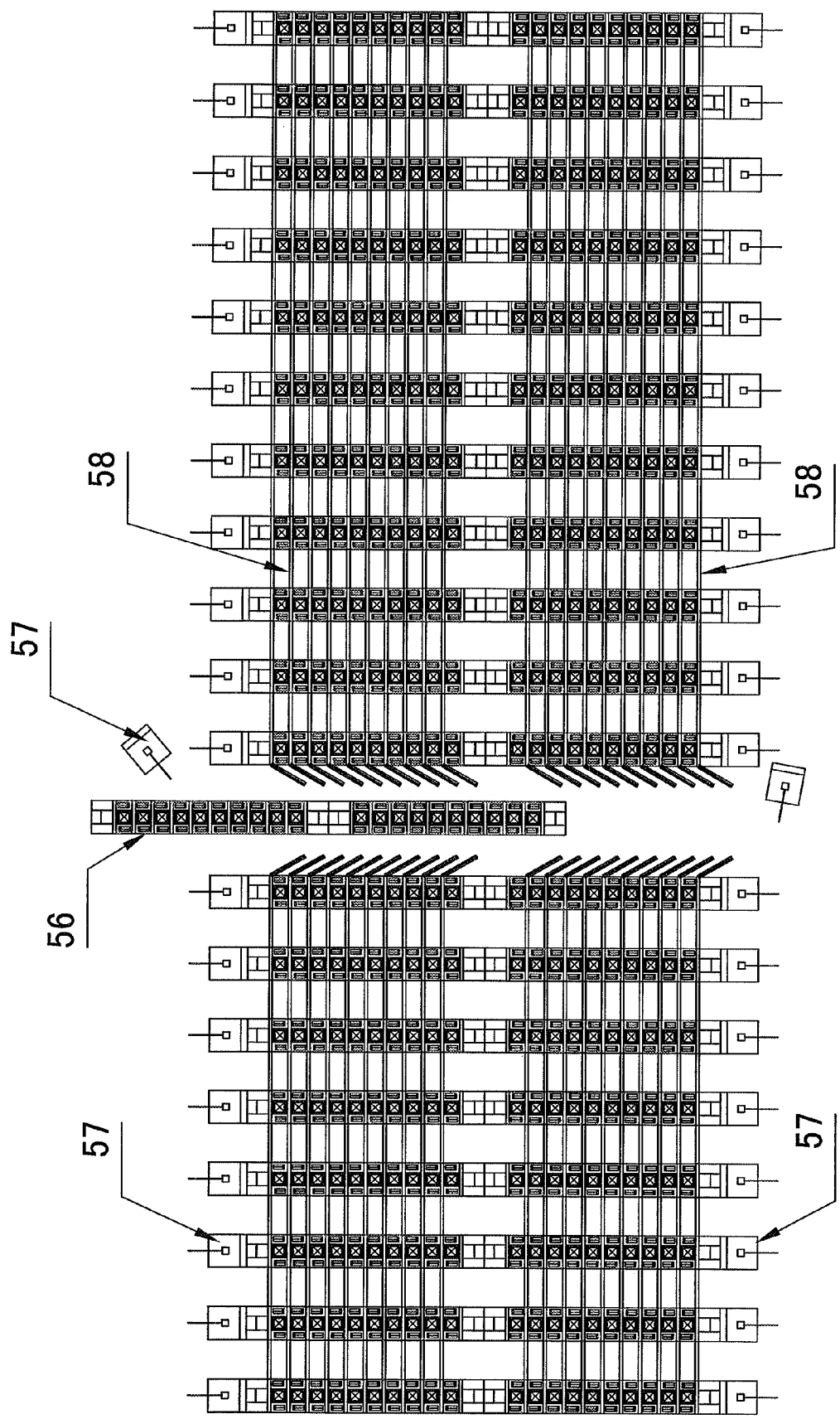
FIG. 19 shows the image chart of maintenance of the wave activated power generation barge with the references (56) long size power generation module, (57) tension buoy and (58) connecting cable.

FIG. 19 shows the image chart of maintenance of the wave activated power generation barge. The wave activated power generation barge is composed of a lot of power generation modules (56) and is maintained by exchanging old module for new module. Each module (56) can be removed in an arbitrary part. The tension buoy (57) cut off from the power generation module (56) is floating on the sea. The power generation module (56) is maintained at the factory.

Figure 20:
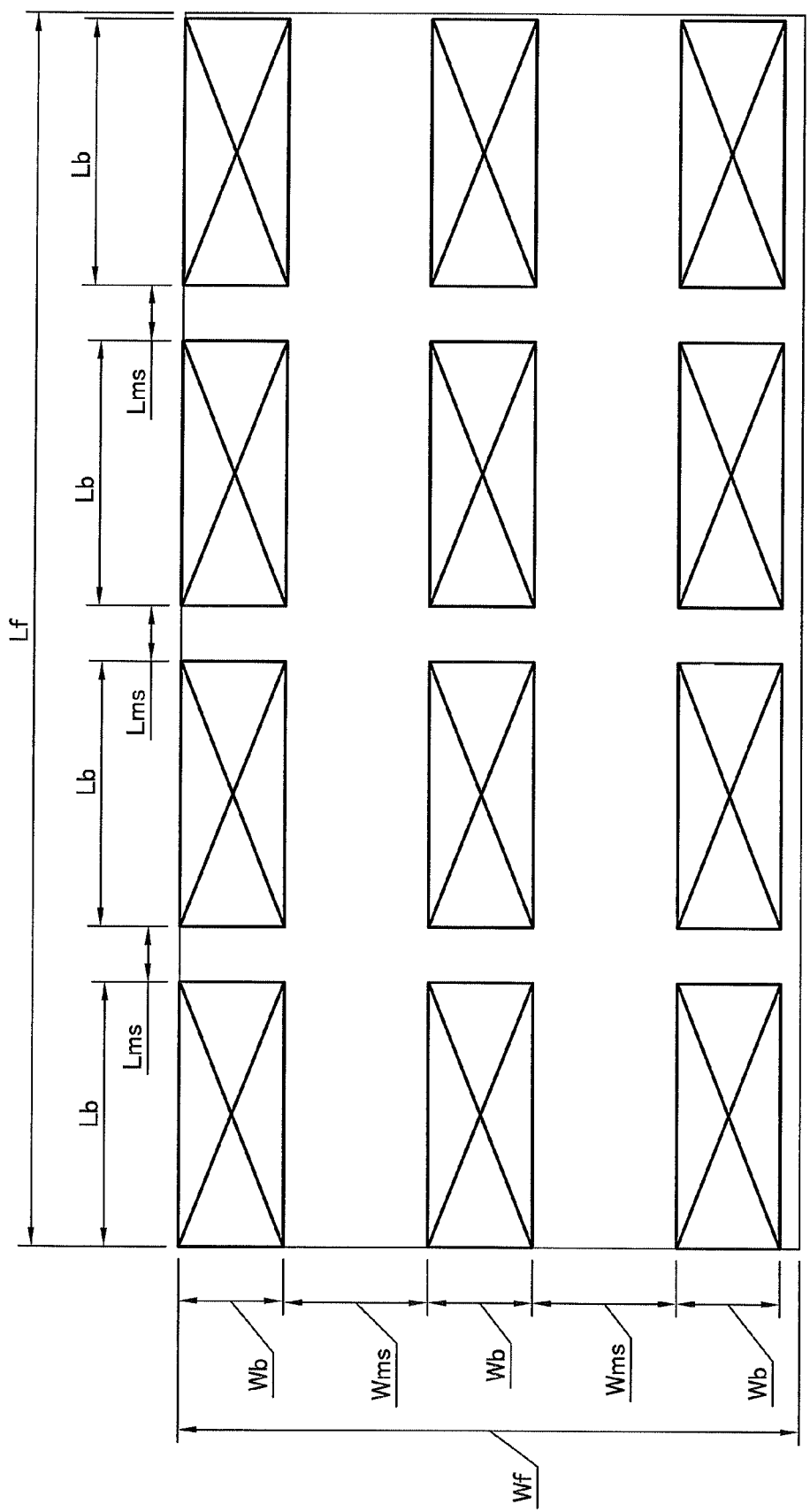
FIG. 20 shows the image chart of power generation farm with the references (Lf) length of power generation farm, (Lb) length of power generation barge, (Lms) margin space length between power generation barges, (Wf) width of power generation farm, (Wb) width of power generation barge and (Wms) margin space width between power generation barges.

FIG. 20 shows the image chart of power generation farm. The length of power generation farm (Lf) is 1000 meters. The length of power generation barge (Lb) is 215 meters. The margin space length between power generation barges (Lms) is 45 meter. The width of power generation farm (Wf) is 500 meters. The width of power generation barge (Wb) is 84 meters. The margin space width between power generation barges (Wms) is 116 meters. The power generation barge is composed of 400 power generation units. There will be 12 barges arranged in the area of 500 m×1000 m.

Ability of power generation in this sample wave activated power generation unit is calculated as shown in Table 10:

TABLE 10

|  | 1 module | 1 barge | 12 barges |
| --- | --- | --- | --- |
| Generation power unit | 20 | 400 | 4,800 |
| Area (m) | 84 × 5 | 84 × 215 | 500 × 1000 |

TABLE 10-continued

|  | 1 module | 1 barge | 12 barges |
|---|---|---|---|
| Power generation (kW) | 163 | 3,252 | 39,024 |
| Ability of power generation (kW*h/year) | 1,511,960 | 30,239,200 | 362,870,400 |

The wave activated power generation is one of the steadiest power generation methods by natural energy. It is characterized by its large amount of energy. The energy for each area is 20-30 times of photovoltaic generation energy and is five times or more the force of the wind. It is said that the wave activated power generation can generate 30,000 kW in the area of 1K square meters. The sample power generation farm, in which 12 barges are arranged in the area of 500 m×1000 m, is calculated to generate 39,024 kW. And, the ability of power generation per year is calculated to be 362,870,400 kW*h/year. The power generation cost after the equipment cost is redeemed is only maintenance cost. The wave activated power generation will become a cheap, safe, permanent energy source.

It will be appreciated that modifications may be made in the present invention. The usage field of FRP structure materials in this invention is not limited to power generation buoy. The power generation buoy of this invention stands vertically in seawater. Moreover, glass fiber FRP that is the material is not corroded with seawater. The square pillar structure of FRP is the best for the construction materials in the sea.

The spirit of this invention is achievement of an efficient wave activated power generation system. For that purpose, this invention developed the power generation buoy made of FRP, the rack and pinion mechanism and controlling system by gearless transmission. Accordingly, it should be understood that we intend to cover by the appended claims all modifications falling within the true spirit and scope of our invention.

What is claimed is:

1. A wave activated power generating device, comprising:
   a platform;
   a buoy vertically positioned to rise and fall relative to motion of waves impacting the buoy and the platform, wherein the buoy includes a plurality of heatproof plastic tubes as internal pressure pillars, each of the plastic tubes having four walls and being square shaped in cross section, a hollow interior of each of the plastic tubes being filled with plastic foam particles, an external surface of each foam particle-filled plastic tube being wrapped with soft FRP prepreg material, and the plurality of foamed plastic tubes together being covered by soft FRP prepreg material;
   a rack and pinion structure operatively connected between the buoy and the platform such that a pinion element of the rack and pinion structure generates rotating torque by moving along the rack element in response to the buoy rising and falling by the wave motion; and
   a power generator unit operative connected to the rack and pinion structure to generate electricity in response to rotating torque generated by the pinion element.

2. A wave activated power generation device according to claim 1, wherein
   the buoy includes an upper portion and a lower portion, the lower portion being filled with ballast weight material such that the buoy stands vertically when floating in water.

3. A wave activated power generation device according to claim 2, wherein at least the upper portion of the buoy is filled with the plastic foam particles.

4. A wave activated power generation device according to claim 2, wherein
   the ballast weight material of the of the lower portion is made from iron particles suspended in a urethane casing.

5. A wave activated power generation device according to claim 1, wherein
   the power generator unit includes a dynamo operatively connected to the pinion element via a gearless transmission, the gearless transmission being configured to control vertical movement of the buoy in response to controlling a torque of the dynamo relative to the rotating torque of the pinion element.

6. A wave activated power generation device according to claim 1, wherein
   the platform includes a rigid barge on which the power generator unit is mounted.

7. A wave activated power generation device according to claim 1, further comprising:
   a shroud assembly formed to surround the buoy such that the buoy is slidably movable in the shroud assembly, the shroud assembly being fixedly mounted to the platform, wherein the pinion element is mounted on the shroud assembly and the rack element is mounted on the buoy.

8. A system for wave activated power generation, comprising:
   a platform; and
   a plurality of buoys vertically positioned to rise and fall relative to motion of waves impacting the buoy and the platform, wherein each of the plurality of buoys includes
   a plurality of rack and pinion structures each operatively connected between a corresponding one of the buoys and the platform such that a pinion element of each rack and pinion structure generates rotating torque by moving along a corresponding rack element in response to the corresponding buoy rising and falling by the wave motion, and
   a plurality of power generator units each operative connected to a corresponding rack and pinion structure to generate electricity in response to rotating torque generated by the corresponding pinion element, and
   wherein each of the plurality of buoys includes a plurality of heatproof plastic tubes as internal pressure pillars, each of the plastic tubes having four walls and being square shaped in cross section, a hollow interior of each of the plastic tubes being filled with plastic foam particles, an external surface of each foam particle-filled plastic tube being wrapped with soft FRP prepreg material, and the plurality of foamed plastic tubes together being covered by soft FRP prepreg material.

9. A system for wave activated power generation according to claim 8, wherein
   each of the plurality of power generator units includes a dynamo operatively connected to the pinion element via a gearless transmission, the dynamo being configured such that a torque of the dynamo is controllably variable relative to the rotating torque of the pinion element such that movement of the buoy is controllably stoppable.

10. A system for wave activated power generation according to claim 8, wherein
    the platform includes a rigid barge on which the plurality of buoys are operatively mounted, and
    the plurality of power generator units are positioned each relative to a corresponding buoy.

11. A system for wave activated power generation according to claim 8, wherein each of the plurality of buoys further includes a ballast weight positioned at a lower end of the plastic tubes that is in contact with water during operation.

12. A system for wave activated power generation according to claim 11, wherein the ballast weight includes iron particles suspended in a urethane casing.

13. A method of manufacturing a buoy for a wave activated power generation device, the buoy being formed so as to be vertically positioned to rise and fall relative to motion of waves impacting the buoy, the method comprising the steps of:
   forming a plurality of heatproof plastic tubes to be internal pressure pillars, each of the plastic tubes having four walls and being shaped square in cross section;
   filling a hollow interior of each of the plastic tubes with plastic foam particles;
   wrapping an external surface of each foam particle-filled plastic tube with soft FRP prepreg material;
   applying heat to each foam particle-filled plastic tube to cause the foam particles to foam in the plastic tube;
   assembling the plurality of foamed plastic tubes together and wrapping the plurality of foamed plastic tubes with the soft FRP prepreg material;
   operatively connecting the assembled plastic tubes to a rack and pinion structure positioned on a platform such that a pinion element of the rack and pinion structure generates rotating torque by moving along the rack element in response the assembled plastic tubes rising and falling by the wave motion; and
   operatively connecting a power generator unit to the rack and pinion structure to generate electricity in response to rotating torque generated by the pinion element.

14. A method according to claim 13, further comprising:
   forming a ballast weight at a portion of the assembled plastic tubes.

15. A method according to claim 14, wherein said step of forming the ballast weight includes forming the ballast weight at a lower end of the assembled plastic tubes that is in contact with water during operation.

16. A method according to claim 14, wherein said step of forming the ballast weight includes suspending iron particles in a urethane casing.

* * * * *